(12) United States Patent
Hawkes et al.

(10) Patent No.: US 7,334,017 B2
(45) Date of Patent: Feb. 19, 2008

(54) CONTENT PROVIDER ENTITY FOR COMMUNICATION SESSION

(75) Inventors: Rycharde Jeffery Hawkes, Bristol (GB); Lawrence Wilcock, Malmesbury (GB); Colin Andrew Low, Wotton-Under-Edge (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 612 days.

(21) Appl. No.: 09/977,501

(22) Filed: Oct. 16, 2001

(65) Prior Publication Data
US 2002/0055974 A1    May 9, 2002

(30) Foreign Application Priority Data
Oct. 17, 2000   (GB)   ................. 0025454.0

(51) Int. Cl.
G06F 15/16      (2006.01)
G06F 15/04      (2006.01)
G06F 15/173     (2006.01)

(52) U.S. Cl. .............. 709/205; 709/204; 709/217
(58) Field of Classification Search ........ 709/204–207, 709/235, 227–229, 249; 712/28, 31; 340/855.5; 370/352, 238, 389; 345/327; 725/39, 93–94; 386/46; 714/749; 455/436
See application file for complete search history.

(56) References Cited

U.S. PATENT DOCUMENTS

| 5,758,281 A | 5/1998 | Emery et al. |
| 5,838,682 A | 11/1998 | Dekelbaum et al. |
| 5,848,143 A | 12/1998 | Andrews et al. |
| 5,884,032 A | 3/1999 | Bateman et al. |
| 5,907,547 A | 5/1999 | Foladare et al. |
| 5,914,951 A | 6/1999 | Bentley et al. |
| 5,937,161 A * | 8/1999 | Mulligan et al. ........... 709/206 |

(Continued)

FOREIGN PATENT DOCUMENTS

EP    0 820 028 A2    1/1998

(Continued)

OTHER PUBLICATIONS

Todd Neff, *The Multimedia Contact Center: Corporate Façade or Human Face*, Apr. 10, 2000, pp. 1-69.
Cobrow Homepage—www.cobrow.com, Jan. 21, 2000.

Primary Examiner—David Wiley
Assistant Examiner—Jude J Jean-Gilles
(74) Attorney, Agent, or Firm—Lowe Hauptman Ham & Berner LLP

(57) ABSTRACT

A content-provider entity provides content to media channels established in respect of a network communication session. The content-provider entity has a transport subsystem for establishing media channel connections to a session transport mechanism in accordance with channel type and connection details received by the entity. The content-provider entity also has a media subsystem providing a respective media handler of appropriate type for each media channel connection established by the transport subsystem. Each media handler is responsible for delivering media content of its associated type from a media source to the corresponding channel connection. A delivery controller of the media subsystem controls the selection and delivery of media content through the media handlers in dependence on context data supplied to the content-provider entity.

20 Claims, 21 Drawing Sheets

U.S. PATENT DOCUMENTS

| | | | |
|---|---|---|---|
| 5,954,798 A | 9/1999 | Shelton et al. | |
| 5,956,027 A | 9/1999 | Krishnamurthy | |
| 6,006,269 A | 12/1999 | Phaal | |
| 6,035,332 A | 3/2000 | Ingrassia et al. | |
| 6,076,100 A | 6/2000 | Cottrille et al. | |
| 6,166,730 A * | 12/2000 | Goode et al. | 715/716 |
| 6,167,432 A | 12/2000 | Jiang | |
| 6,181,697 B1 | 1/2001 | Nurenberg et al. | |
| 6,259,701 B1 | 7/2001 | Shur et al. | |
| 6,295,550 B1 | 9/2001 | Choung et al. | |
| 6,295,551 B1 | 9/2001 | Roberts et al. | |
| 6,311,231 B1 * | 10/2001 | Bateman et al. | 379/265.09 |
| 6,336,117 B1 * | 1/2002 | Massarani | 707/100 |
| 6,349,290 B1 | 2/2002 | Horowitz et al. | |
| 6,377,944 B1 * | 4/2002 | Busey et al. | 707/3 |
| 6,385,646 B1 | 5/2002 | Brown et al. | |
| 6,418,471 B1 | 7/2002 | Shelton et al. | |
| 6,430,567 B2 | 8/2002 | Burridge | |
| 6,434,599 B1 | 8/2002 | Porter | |
| 6,442,590 B1 | 8/2002 | Inala et al. | |
| 6,453,438 B1 * | 9/2002 | Miller et al. | 714/749 |
| 6,487,195 B1 | 11/2002 | Choung et al. | |
| 6,529,941 B2 * | 3/2003 | Haley et al. | 709/204 |
| 6,654,457 B1 | 11/2003 | Beddus et al. | |
| 6,654,815 B1 | 11/2003 | Goss et al. | |
| 6,665,395 B1 | 12/2003 | Busey et al. | |
| 6,687,241 B1 | 2/2004 | Goss | |
| 6,687,877 B1 | 2/2004 | Sastry et al. | |
| 6,690,654 B2 | 2/2004 | Elliott et al. | |
| 6,697,858 B1 | 2/2004 | Ezerzer et al. | |
| 6,714,987 B1 * | 3/2004 | Amin et al. | 709/249 |
| 6,747,970 B1 * | 6/2004 | Lamb et al. | 370/352 |
| 6,748,420 B1 | 6/2004 | Quatrano et al. | |
| 6,754,713 B1 * | 6/2004 | Dascalu | 709/229 |
| 6,769,127 B1 * | 7/2004 | Bonomi et al. | 725/39 |
| 6,771,766 B1 | 8/2004 | Shafiee et al. | |
| 6,807,562 B1 * | 10/2004 | Pennock et al. | 709/204 |
| 6,807,564 B1 * | 10/2004 | Zellner et al. | 709/206 |
| 6,810,405 B1 | 10/2004 | LaRue et al. | |
| 6,826,194 B1 | 11/2004 | Vered et al. | |
| 6,909,708 B1 * | 6/2005 | Krishnaswamy et al. | 370/352 |
| 7,145,898 B1 * | 12/2006 | Elliott | 370/352 |

FOREIGN PATENT DOCUMENTS

| | | |
|---|---|---|
| EP | 0 829 996 A2 | 3/1998 |
| EP | 0 838 770 A2 | 4/1998 |
| GB | 2 320 843 A | 7/1998 |
| GB | 2 342 529 A | 4/2000 |
| GB | 2 359 215 A | 8/2001 |
| WO | WO 98/37687 A1 | 8/1998 |
| WO | WO 98/59461 A2 | 12/1998 |
| WO | WO 99/18514 A1 | 4/1999 |
| WO | WO 99/26153 A2 | 5/1999 |
| WO | WO 00/03329 A1 | 1/2000 |
| WO | WO 00/41118 A2 | 7/2000 |
| WO | WO 00/58867 A1 | 10/2000 |
| WO | WO 01/03036 A1 | 1/2001 |
| WO | WO 01/08061 A1 | 2/2001 |
| WO | WO 01/24092 A1 | 4/2001 |
| WO | WO 01/28206 A1 | 4/2001 |

* cited by examiner

CONTENT PROVIDER ENTITY FOR COMMUNICATION SESSION

FIELD OF THE INVENTION

The present invention relates to a content-provider entity for providing content to media channels established in respect of a network communication session. In particular, but not exclusively, the present invention relates to a content-provider entity that can be joined to a communication session set up for an enquirer using the web to call a contact center, the content-provider entity being joined to the session pending the joining of a customer service representative. As used herein, the term "web" or 'World Wide Web' means a network of systems running applications using the HTTP protocol (any version) and similar and successor protocols.

BACKGROUND OF THE INVENTION

The Internet and the World Wide Web (WWW) have made it possible for enterprises to sell products and services by using the WWW to describe offers, using various means such as WWW forms or electronic mail to conduct transactions. This form of selling is based around the catalogue model that originated in the 19$^{th}$ Century, where the WWW site substitutes for the paper catalogue, and the postal service is replaced by the modern online equivalent.

Many enterprises currently use the telephone to replace or augment the catalogue model. A customer can call the organisation and purchase goods and services interactively over the telephone. This has the advantage that a customer can interact directly with a Customer Service Representative ("CSR"), but has the disadvantage that the telephone is a non-visual medium.

The need to handle large numbers of customers simultaneously, and the concurrent need to manage a pool of CSRs, has led to the development of the call centre, and the development of specialised software control packages to determine how incoming customer calls are routed to CSRs.

It is possible to combine the catalogue model of WWW selling with the telephone call centre (and other communication channels) to produce what is often called contact centre. The contact centre is like a telephone call centre, but instead of CSRs handling only telephone calls, they may be expected to handle customer communications in a variety of formats: FAX, electronic mail, telephone and WWW are typical. A contact centre is characterised by multiple contact or communication channels, and a pool of CSRs who interact with customers to provide services, products or support. The contact centre provides the illusion of a single point of contact for customers on a regional, national or even international basis. U.S. Pat. No. 5,848,143 (Geotel Communications) discloses a contact center capable of handling both traditional telephone calls and Internet calls where, in the case of the latter, the customer contact can involve multimedia exchanges.

Users of the public telephone system are familiar with automata in the form of the Interactive Voice Response (IVR) system. These are used in applications such as voicemail, call centres, and cinema listings, and consist of a recorded or synthetic human voice that offers a menu of choices, and the customer interacts by using telephone keypad tones. More sophisticated automata are finding their way into telephone directory enquiries, into business premises as telephone receptionists, and as "virtual personal assistants" for business telephone users. However, identifying what tasks can be usefully given to automata is itself a challenge.

Callers to call centers are often put on hold pending the availability of a suitable customer service representative. To relieve customer boredom and ensure them that they are still connected, it is usual to play the customer some music or provide information of general interest or about specific promotions.

It is an object of the present invention to provide for the delivery of richer information to a customer on hold, and generally to facilitate the delivery of multiple media types into a communication session.

SUMMARY OF THE INVENTION

According to the present invention, there is provided a content-provider entity for providing content to media channels established in respect of a network communication session, the content-provider entity comprising:

an entity manager for receiving, in respect of a particular communication session, context data about the session and channel information about the channels established for the session including the media types carried by the channels and channel connection details;

a transport subsystem for establishing, in accordance with the channel information received by the entity manager, media channel connections to a session transport mechanism associated with said session; and a media subsystem providing a respective media handler of appropriate type for each media channel connection established by the transport subsystem, each media handler serving to deliver media content of its associated type from a media source to the corresponding channel connection, and the media subsystem further including a delivery controller for controlling the selection and delivery of media content through the media handlers in dependence on said context data.

The content-provider entity is, for example, joined to a communication session in the event that an enquirer already joined to the session has to wait before a CSR is available to join in the session. The content delivered can be marketing material customised for the enquirer on the basis of the context data.

BRIEF DESCRIPTION OF THE DRAWINGS

A web interaction system embodying the invention will now be described, by way of non-limiting example, with reference to the accompanying diagrammatic drawings, in which.

BEST MODE OF CARRYING OUT THE INVENTION

General Structure of Communications Mechanism

Figure 1:
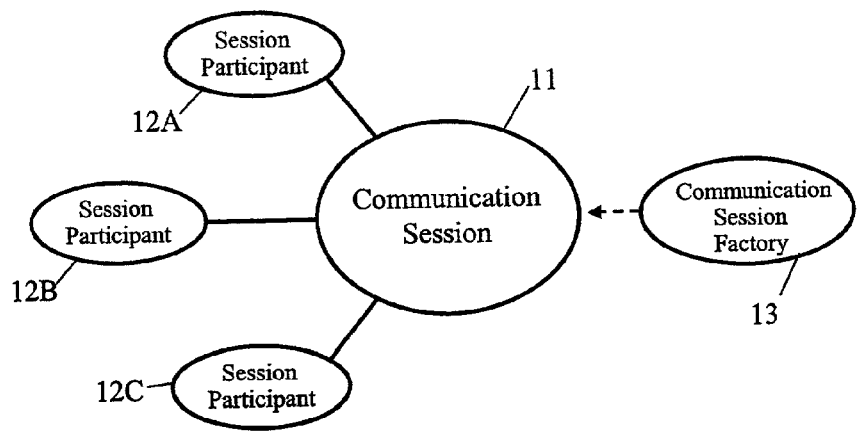
FIG. 1 is a diagram of a communication session abstraction of the web interaction system.
Figure 2:
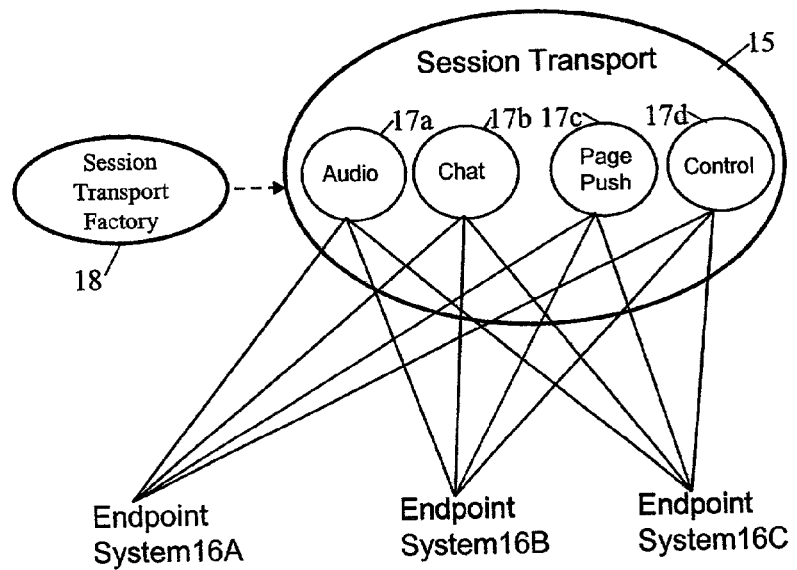
FIG. 2 is a diagram of a session transport of the web interaction system.
Figure 3:
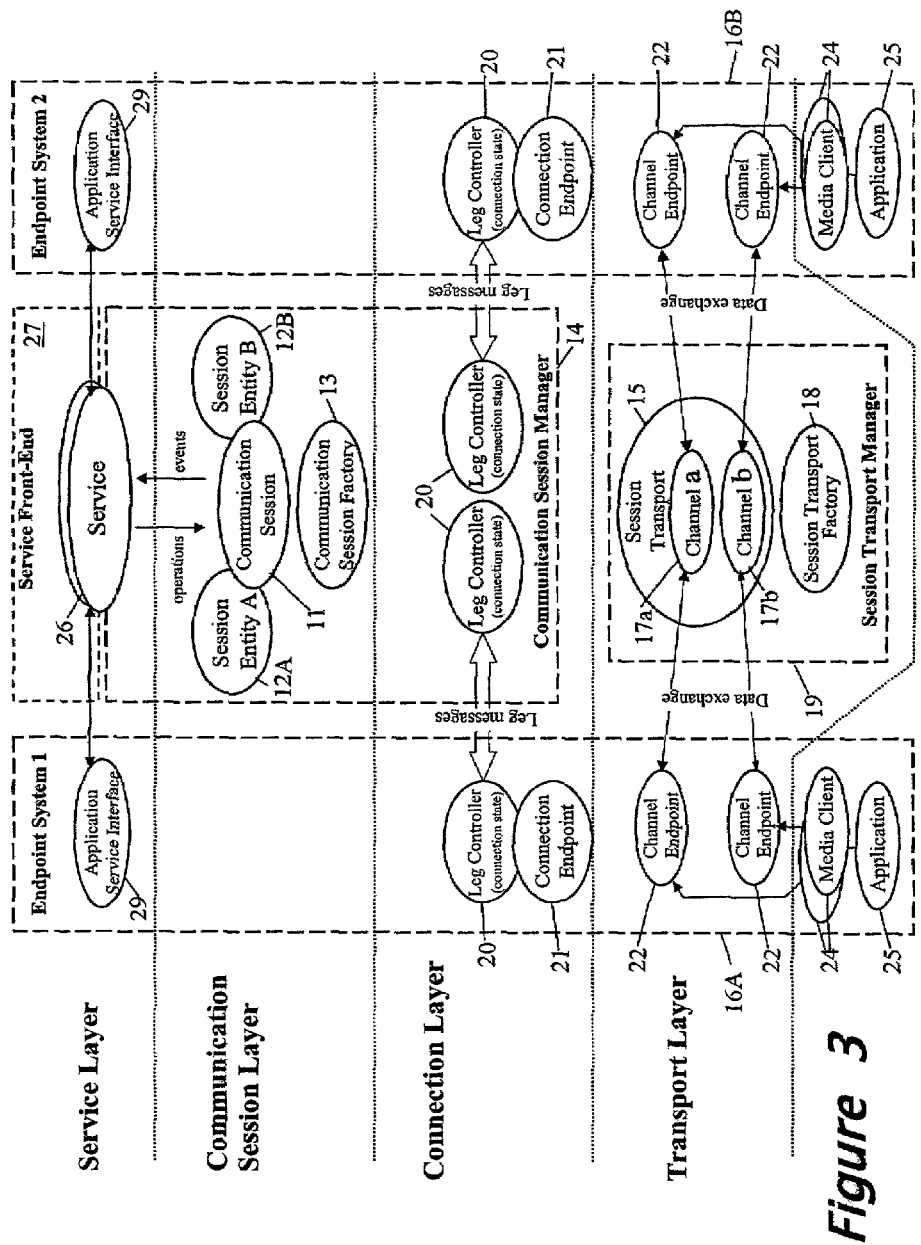
FIG. 3 is a diagram showing the functional layers of the system.

FIGS. 1 to 3 illustrate the basic functional concepts and elements of the web interaction system by which multiple parties can communicate with each other across the web (World Wide Web) using multiple media types.

As will be more fully described below, the basic high-level abstraction used by the system is that of a communication session 11 (FIG. 1) to which one or more entities 12 A, B, C (participants) can be added or removed. as directed by a web interaction service 26 (FIG. 3) to provide a required communication service behaviour. The communication session itself is generic and service-independent. The communication session abstraction 11 is modelled in the web interaction system by appropriate data structures and methods (for example, implemented as instances of a communication session object) for keeping track of a current session and its participants, and for effecting operations such as the adding and removal of participants. The functionality for creating, managing and implementing session instances is provided by a communications session manager 14 (shown in dashed lines in FIG. 3).

Associated with each communication session 11 is a session transport 15 (FIG. 2) which is an abstraction of functionality for actually effecting data communication between endpoint systems 16A, B, C corresponding to the session participants 12A, B, C, this communication being through one or media channels 17a, 17b, etc. The session-transport functionality is typically embodied as a central session-transport manager 19 (FIG. 3) and communication components associated with the end-points, the manager being responsible for creating and managing a respective session-transport object instance for each session transport where state data is held for that session transport.

Thus, the communication session manager 14 is concerned with the high level management and control of sessions whereas the session-transport functionality is concerned with the establishment and maintenance of the required media channels for the session transport that underlies each communication session.

The on-going operation of the session-transport functionality is largely independent of the corresponding communication session manager 14 except for when session creation/destruction results in the creation/destruction of an underlying session transport, and for when the addition/removal of session participants results in the addition/removal of channels to/from the corresponding endpoint systems. The session manager 14 and the session-transport functionality are kept in step through "leg controllers" 20 (shown in FIG. 3) which provide a way for a session 11 to pass to endpoint systems the information required to join a session transport, and to receive back related status information.

The communication session 11, session transport 15, media channels 17, and leg controllers 20 are considered in more detail below with particular reference to FIG. 3. This Figure presents a layered view of how the various elements of the web interaction system inter-relate to each other, the specific scenario shown being that of two session entities connected to the same communication session. As is typical for a layered model, the functionality of the higher layers is implemented using that of lower layers.

Communication Session—A communication session 11 is a representation of the state of a set of communicating entities. An entity (participant) 12 will in most cases be a person, although software automata or Bots can also be participating entities. By communicating is meant that entities are using one or media types to communicate, such as speech (audio), video, plain text, diagrams and illustrations, graphics, animations and 3D content, the kind of communications that are appropriate between human beings who want to share information. By state is meant the collective attributes of a specific session: the identities of the communicating entities, the media types in use, the pattern of distribution of information, global session properties (such as admission criteria), privileged members of the set, etc.

Associated with each instance of a communication session is a service instance that imparts service specific behaviour to the session by how it exercises the basic operations associated with the session (these operations are outlined below). It is the service instance that initiates creation of a corresponding communication session instance by making a request to a communication-session factory 13 functionally embodied in the communication session manager 14. Destruction of the communication session instance is also controlled by the associated service instance and uses a "Destroy" operation of the session instance. The combination of the communication session instance (and its associated leg controllers described below) and the corresponding service instance, form a service-session functional entity that manages group communication for a particular instance of a particular service.

Each communication session instance has associated functionality for carrying out the following operations in respect of the session it represents:
1. Maintain the set of session entities currently in the session, together with individual connection states to the session (as reported through the session leg controllers—see below) and the various items of data that may have been collected about the entities.
2. Create a session transport instance using session-transport factory functionality 18. The session transport is preferably created in a lazy fashion, only when required. The identity (ID) of the session transport instance and address forms part of the state of the communication session.
3. In response to requests from the associated service instance, carry out a small number of session operations in respect of session entities, the results of the operations being reported in session events. Generally, the operations involve communication with the session entity (participant) concerned to cause changes in the connection state of the entity, these changes then being reported back to the session by the leg controllers and resulting in the generation of an appropriate event to inform the associated service instance of the result of the operation. The basic session operations and their corresponding events are:
    Add identified participant to the session—this results in an invitation being passed to the identified participant system followed by the generation of an "Added" event; if the invitation is accepted (as notified to the session through the corresponding leg controller) a "Connected" event is produced whereas if the invitation is declined (again, reported through the leg controller) a "Declined";
    Remove identified participant from the session—the identified participant is removed from the session (and session transport) and a "Removed" event generated (if the participant was the last remaining participant, then an "All Removed" event is generated instead);
    Transfer between two identified participants—the second identified participant is invited into the session and if this participant accepts to join, then the first participant is removed from the session. Successful transfer results in a "Transferred" event being generated.

If appropriately authorised in the context of a particular service, session entities (participants) can also perform simple autonomous operations that affect the communication session. Thus, a session entity can autonomously Join a communication session, if the connection details of the communication and session transports are known and the session entity has the appropriate privileges. Session entities can autonomously Leave the session. Both autonomous operations are arranged to cause the state of the communication session, including the set of session entities, to be updated with appropriate communication session events.

The service instance associated with a communication session instance has access to the data held by the session instance, including the participant data and session transport data.

The Session Transport—As already indicated, each communication session requires an underlying session transport instance to communicate data (both real-time, and non-real-time) between session entities. The session transport provides for the transport of various media types in the form of un-interpreted messages of digital information. Any media type that can be reduced to a stream of bytes can be transported in the form of variable length messages. A session transport can be implemented, for example, by an IP multicast group, a unicast IP conference, or, as in the specific embodiment to be described hereinafter, a tightly-coupled, group communication server.

The session-transport functionality (in particular, session-transport manager 19) maintains state data on the state of each session transport. The state of a session transport is the collective attributes of a session transport, namely the connection, authentication and authorization parameters required to join in the data transport mechanism, the set of channels in the session transport, and the set of channel endpoints connected to the channels.

Session-transport factory functionality 18 of the session-transport manager 19 is responsible for creating instances of a session-transport object used to represent and permit the set up of each session transport (in particular, a session-transport object will hold the state data for the session transport it represents). Requests from a communication session object to the session transport factory functionality to create a session transport are parameterised with the characteristics of the required session transport. The session transport factory 18 uses this information to create an instance of the session transport object that satisfies those characteristics.

Media Channels—A session transport encompasses one or more media channels 17 where a channel is an instance of a multi-party communications path between channel endpoints 22. Typically, a channel is used to disseminate information of a given media type. Examples of media types are textual chat, voice chat, shared whiteboard, collaborative browsing, and real-time voice and video. A channel can be used for sending control information, e.g. media-channel signalling information, queue status information, or positional updates in a 3D virtual environment. A channel can be used to deliver any digital information that can be reduced to a sequence of bytes, and will deliver this information as a sequence of messages to multiple channel endpoints.

An instance of a channel is created within the context of a single session transport. A channel has a unique name within the session transport. A channel defines a communication path between the connected channel endpoints, that is orthogonal to all other channels associated with the session transport.

A channel endpoint 22 is an instance of an addressable communication source or destination. A channel endpoint has a unique name within the context of a channel. An instance of a channel endpoint is bound to a single, named channel.

A media client 24 (FIG. 3) is an instance of a specialized function to send and receive data of a specific media type, using a channel endpoint 22 bound to the channel for the media type. The media client 24 provides a specialized programmatic interface to the channel for communicating with other media clients of the same type. An application 25 wishing to communicate using a particular media type, does so by creating a corresponding media client 24 which then creates a channel endpoint that contacts the session-transport manager 19 to establish a named channel appropriate for the specific media type, if one does not already exist. The media client 24 then tries to join the channel by creating a channel endpoint 22 and binding it to the channel. The application 25 can then use the media client to send data to and receive data from other applications that are associated, via their respective media clients, with the other channel endpoints connected to the channel.

There are three modes for sending data on a channel 17 from a channel endpoint 22:
1. Data is sent to all channel endpoints connected to the channel, including the sender.
2. Data is sent to all channel endpoints connected to the channel, excluding the sender.
3. Data is sent to a specific channel endpoint in the channel, by specifying the channel endpoint address. No other channel endpoints connected to the channel receive that data.

An application 25 may join any number of sessions. For each session the application joins, it will seek to bind to a set of media channels previously specified to it by the communication session manager 14 in a media description.

The media description specifies the number and media type of channel instances in a session transport, and the connection details required to join the session transport (these connection details include the address and type of the session transport, and the authentication and authorization information required to join the session transport). The Session Description Protocol (SDP, RFC 2327) defined by the IETF is an example of a standard scheme that can be used to specify the media description. Other ways of specifying the media description are also possible, of course,— for example, the media description can simply identify the set of media clients to be instantiated by media applications, the address of the session transport, and the authentication information required to join the session transport.

Typically, the application 25 creates one media client for every media type supported by the session.

Leg Controllers Each communication session instance maintained by the communication session manager 14 needs to be able to communicate with the endpoint systems 16 that correspond to its session entities 12 in order to invite the endpoint systems to connect up with the session transport, and to monitor the states of connectivity of the endpoint systems and thereby the connection state of each session entity 12 to the communication session 11. A small number of connection states are defined that model the stages of a session entity joining and leaving a communication session. The states correspond to the notions of inviting a called entity to a session, alerting the called entity of the invitation, connecting to the session transport, being in a state of connection to the session transport, requesting a disconnect from the session transport, and being disconnected from the session transport.

The communication between a session instance and an endpoint system 16 corresponding to one of its session entities 12 is effected through a pair of leg controllers 20, one in the communication session manager 14 and the other in the endpoint system 16. (The term leg is used because session diagrams, such as shown in FIG. 1, have a number of legs attached to a session body, each leg representing a participant). The leg controllers 20 provide the signalling functionality and state machine functionality for inviting an endpoint system into a session transport and subsequently change and monitor the connection state of the entity.

More particularly, to invite an endpoint system to connect up with a session transport, the inviting entity creates a leg controller and contacts the endpoint system at a connection endpoint 21 of the system (the connection endpoint provides a unique address for the endpoint system and is used in a similar way as a telephone number in the PSTN). This results in a corresponding leg controller being established at the endpoint system after which the pair of leg controllers exchange "leg messages" that carry a variety of data, the most important of which is the media description of the session transport which the endpoint system uses to set up media channels as already described. The state of connectivity of the endpoint system is also reported via the use of leg messages. As already indicated, the connection-state abstractions exchanged by the leg controllers represent high-level, logical participation in the session transport, and are independent of the communication mechanism used by the session transport. Typically, the connection states are:

For the inviting entity:
an inviting state between when an invitation has been sent to an endpoint system to join a session and when a message is received back indicating whether the invitation has been accepted or declined and entered the established state;
a connecting state between the acceptance of the invitation by the endpoint system and when an indication is received that the endpoint system has connected to the session transport;
an established state between when the endpoint system connects to the session transport and either when the endpoint system disconnects from the session transport or the inviting entity sends a message to the endpoint system requesting disconnection;
a requesting disconnection state between when the inviting party requests disconnection by the endpoint system and when disconnection is reported back;
a final state entered after disconnection has been reported from the endpoint system or the joining process fails before reaching the established state.

For the invited endpoint system:
an initial state up until when an invitation to join a session is accepted. The significance of this state may vary depending on the role of the endpoint system. Thus, where the endpoint system is the initiator of a communication service request, the initial state effectively corresponds to the period between when the request is issued and when an invitation to join a session is received back since the invitation will generally be automatically accepted by the endpoint system (note that the invitation may be either explicit or implied by the passing to the endpoint system of the information necessary to join a session). In contrast, where the endpoint system is one receiving an invitation which it did not instigate, the initial state lasts between when the invitation is received and when it is accepted by the human or automated operator of the system. In either case, the acceptance/rejection of the invitation is reported back in a leg message to the inviting system.

a connecting state between the acceptance of the invitation by the endpoint system and when the endpoint system has connected to the session transport;

an established state between when the endpoint system connects to the session transport and either when the endpoint system disconnects from the session transport or the inviting entity sends a message to the endpoint system requesting disconnection.

a disconnecting state between when either the inviting party or endpoint system user requests disconnection from the session transport and when disconnection is achieved;

a final state entered after disconnection from the session transport or upon the joining process failing before reaching the established state.

Both leg controller instances only exist for the duration of the participation of the invited endpoint system in the session transport.

The external interface to, and logical signalling used by, the leg controllers is independent of the mechanism used to transport the leg messages carrying the signalling information. Many different transport mechanisms for leg controller messages are possible. For example, Java Message Service (JMS) can be used or a system such as described in our co-pending patent application GB 9920834.0 filed Sep. 4, 1999 that enables communication to the customer desktop through a firewall. Internet protocol (IP) socket and Session Initiation Protocol (SIP) transports are other possible alternative implementation choices.

By using the above mechanisms, a communication session instance can implement the session operations by translating operations into a sequence of operations on instances of leg controllers to change the connection state of the affected session entities. The net effect of operations can be described in terms of a simple leg algebra of addition and subtraction of legs into the communication session and are reported in appropriate session events.

Layered Model—Having described in turn the basic concepts and elements of the web interaction system, it is worth considering from a broader perspective the layered model of the system shown in FIG. 3. This layered view organises the system into four layers, each representing a different logical view of the connectivity and communication between the various entities.

The four layers of the model are described below:

1. The Service Layer represents the service logic written by application developers to intelligently conference session entities into a communication session. A service 26 manipulates the connection state of a set of session entities 12 to a communication session 11, using only the elements of the Communication Session Layer. A service uses the communication session operations to invite entities to or disconnect them from the session, and uses the communication session events to monitor changes in connection state of the session entities. Many different services can be written, each using the underlying Communications Session Layer. At the service level, each endpoint system communicates with the service 26 via a service interface 29 that typically takes the form of service-specific web pages running in a browser application.

2. The Communication Session Layer offers a high-level view of the participation of session entities 12 in a communication session 11. Users of this layer deal only with very high-level abstractions of participation in a conference. The communication session 11, communication session factory 13, and session entity 12 are the principal elements of this layer. The communication session 11 and session entity 12 uses the leg controller 20 to invite the remote participant to join the session transport 15.

3. The Connection Layer represents the protocol, messages, events, state machine and operations used to invite a participant 12/16 to a session transport 15, and subsequently manipulate the connection state of the participant to the session transport. The leg controller 20 is the principal element in the connection layer. Connect and disconnect procedures offered by the connection layer are independent of the implementation mechanisms used for the transport layer. The connection layer elements use the operations, and consume the events offered in the transport layer. The events generated by the connection layer are used by the communication session layer to update the state of session entities 12 and the communication session 11.

4. The Transport Layer represents the elements involved the exchange of application data between session participants. The session transport 15 is instantiated by the communication session 11 using the session transport factory 18. Channels 17 and channel endpoints 22 can be instantiated by any entity with sufficient privilege. For example, both entities in the connection layer and media clients can be authorised to instantiate channels.

The messages exchanged between functional entities in the connection layer can contain information from other layers, in addition to the specific information of the connection layer itself. Services in the service layer are able to pass arbitrary information as key-value pairs to session participants in the add and remove operations. The communication session layer uses the transport layer messages to send information to invited session participants describing the current state of the communication session abstractions, allowing session participants to reconstruct the current view of the communication session layer.

Service Scenarios

The above-described architecture of the web interaction system allows considerable flexibility in how a request from a user to communicate with one or more other participants is satisfied. How the request is handled depends on the characteristics of the service 26 to which the request is directed, it being the service that controls what session is involved in the communication (including whether this is a new or an existing session) and what other participants are invited to join the selected session.

A service is embodied as functionality for providing the desired service behaviour using the session resources available to it in the communication session manager 14 (session creation/destruction, the session operations described above for adding and subtracting session participants, and the feedback of session state information in event messages generated in response to session events).

Before describing the mechanisms used for routing a call initiator to a session and inviting other participants to that session, a number of service scenarios will be outlined to illustrate the breadth of applications possible using the above-described communications architecture. Three general types of services will be described, namely:

One-to-one customer/CSR interactions where a customer wishes to interact with a CSR at a contact center;

"Shop with friends" where several people wish to conduct coordinated browsing; and "Page is Place" where concurrent visitors to the same web page can communicate.

In outlining the service scenarios, the following terms are used:

Text Chat. Each member of a session can type lines of text into a chat GUI at any time. These are sent to other session members in real time (which in practice may mean a delay of up to a few seconds) via a text media channel and displayed in a chat window, interleaved with the name of the person sending the text.

Page Push. The page corresponding to a WWW URL is displayed in a reserved browser window of each session member. A media channel is used to convey URLs between participants to the session. In a "Follow-Me Tour", clicking on a hyperlink on the page in the Page Push window results in all session members following that link in synchrony. Page Push, and its variants, is a way for session members to share WWW content.

Callback or Dialback. A Web session member can be called-back at their telephone number. This feature is common in telephony contact centers, and a telephony contact center will have dedicated hardware for terminating and routing incoming telephone calls to CSRs. This hardware will usually have the ability to originate calls, making it possible to set up a dialback call between a CSR and a customer. The capability of adding a dialback connection to an ongoing Web interaction is an example of hybridization between existing contact centers, which are oriented around telephony, and the next generation of Internet Relationship Management centers which use Internet technology for communication with a customer.

Deferred Callback. A customer is called back at a nominated time.

Customer/CSR 1:1 Interactions A number of different interactions are possible and each can be considered as constituting a service. These interactions include:

Online Help—A customer is browsing WWW pages belonging to an enterprise and wants to talk to a CSR in that enterprise. The page will have some kind of "Help" button hyperlink which the customer clicks on. The customer browser then progresses through a WWW dialog which makes it possible for the customer to identify themselves by submitting a small number of personal details (e.g. name, customer reference, email address etc). The customer browser then launches graphical user interfaces (GUI) for each of the media types used in a session. This will typically be page push, and text chat or voice chat. An available CSR is discovered, joins the session, and the customer and CSR can then begin to discuss the issue that caused the customer to request help. The session can be extended by inviting-in additional CSRs, and the "call" can be transferred to another CSR. The session can also be extended to include additional customers.

Online Help with Dialback—As in the "Online Help" service, but the customer provides a Public Switched Telephone Network (PSTN) number so that the CSR (in fact, the telephone callback hardware referred to above) can dial back to the customer, so creating a voice channel in addition to the other communication channel. The PSTN, rather than the internet, is normally used for voice traffic because it provides a higher quality channel for voice communication than Voice over IP at the current time.

Online Help with Deferred Dialback and Web Rendezvous—As in "Online Help with Dialback", the difference being that the customer wants to communicate to a CSR at some future specified time. This is useful, for example, when all CSRs are allocated, or the customer wants to reserve a callback at a convenient time. The customer goes through the initial dialog, provides personal details including a telephone number, and is provided with the URL of a page to return to at a later time. When a CSR calls back by telephone, the customer goes to the specified page and is joined to a session to which the CSR is also invited. How this is achieved is described later in this document.

Deferred Dialback—The customer uses the initial WWW dialog to select a telephone callback at a specified time. No web interaction session is created, and the Internet is not used as a communication technology.

Figure 4:
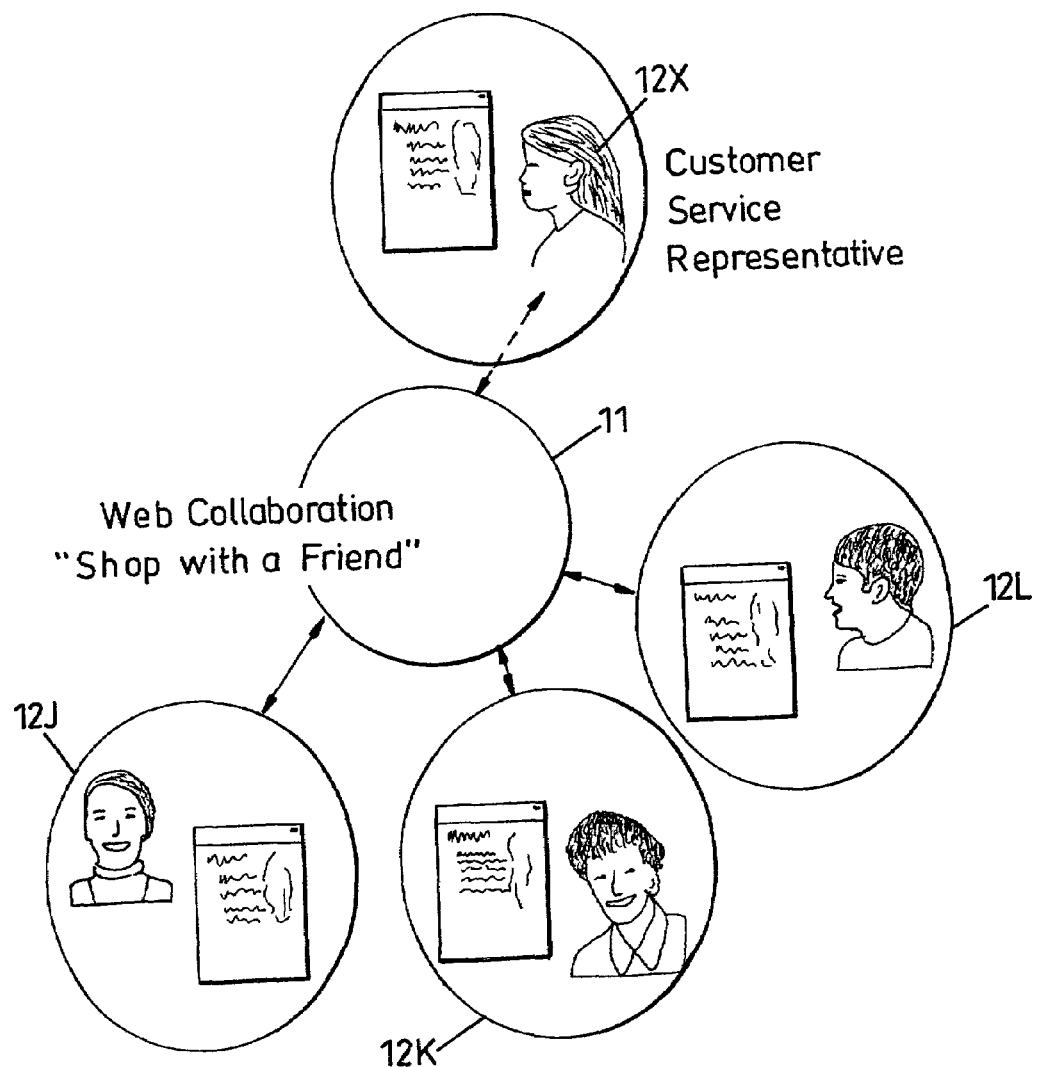
FIG. 4 is a diagram of a "Shop with Friends" session scenario.

Web Rendezvous—The customer is speaking with an CSR over the telephone and decides to do a web based communication for page push or chat. At this point the CSR presses the "Rendezvous" button which will generate a session identifier/password for the CSR to give to the customer. The customer goes to a URL that is the "Rendezvous page" and is joined to a session to which the correct CSR is also invited. How this is effected will be described later on in this document Shop with Friends (FIG. 4)—This scenario assumes that two or more friends want to browse and make purchases online. They want to communicate with each other using text or audio chat, and see the same WWW pages in a "Follow Me" tour as described above. In FIG. 4, three friends 12J, K, L are depicted as viewing the same web page together, discussing its content (via an audio media channel), and they have invited a CSR 12X to answer some questions. From the customer perspective this scenario is identical to the "Online Help" scenario, with the exception that the session members are customers and not a mix of customers and CSRs. How a "Shop with friends" session is established and the parties joined to it will be described hereinafter.

It is to be understood that the label "Shop with Friends" is used herein simply for convenience and it will be appreciated the techniques described herein relating to the "Shop-with Friends" scenario are also applicable to other group sessions between users that are not in the privileged positions of CSRs or other parties having special access to the interaction service system.

Figure 5:
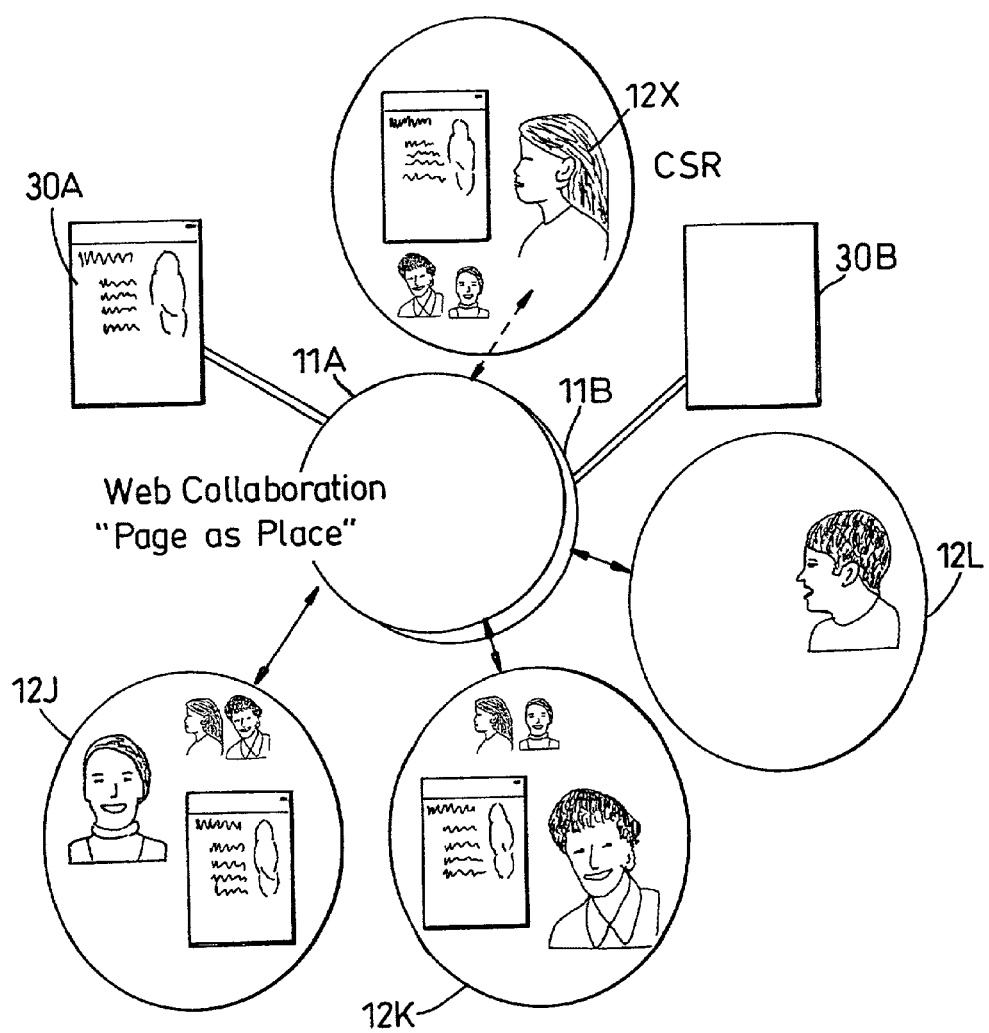
FIG. 5 is a diagram of a "Page is Place" session scenario.

"Page as Place" (FIG. 5)—The "Shop with Friends" scenario uses a fixed multi-party session, and a succession of WWW pages "flow throw" the session using follow-me page push. Session participants effectively wander around the WWW, the session maintaining its coherence as it travels. An alternative is the "Page as Place" scenario, where a communication session is immutably associated with a specific web page. In this scenario, as customers move from page to page, they move from session to session. FIG. 5 shows four women 12J, K, L, X looking at two different pages 30A and 30B, each being associated with a respective session 11A, 11B. The woman 12L is viewing page 30B and is in session 11B by herself. The two women 12J,K are both viewing page 30A and are therefore in the same communication session 11B and can communicate with each other via appropriate media channels; these women 12J,K have been joined by a third person 12X—a CSR who is monitoring activity on page 30A.

The advantage of this scenario is serendipity: it corresponds closely to what happens when a person wanders around a mall, meeting a different set of people in each shop. Wandering into a page showing lawnmowers, one can choose to see whether anyone else is also looking at lawnmowers, and engage them in conversation. One might see a CSR just "standing around" on the page, or one could listen in on what a CSR was telling another customer.

There is a great deal that can be done with this simple concept. Instead of thinking of a WWW site as a catalogue, it can be organized like a department store or a mall into a set of places—the perfume department, the coffee shop, ceramics, cooking and so on. Instead of a customer having to decide whether their query is important enough to justify contacting a CSR, they can see CSRs "standing around" when they move from page to page. It is not considered an imposition to approach an idle sales assistant in a shop even for the most trivial of queries, because we know that is what they are there for.

Session Routing

A description will next be given, with reference to FIG. 6, of how a party at an endpoint system 16 initiates participation in a service-specific communication session. For simplicity, in the following, no distinction is made between endpoint system 16 and the participant party using the system.

In general, the initiating party 16 will be requesting a specific service that is centred around a particular target subject such as a person, page, catalogue item, or any other concept that is meaningful both to the requesting party and the routing functionality that handle the requests. The selected service will involve communication with another participant or participants who are in some way associated with the target subject. The process of joining the desired communication service for the requesting party is a two-step routing process:

The first step is to select a communication session 11 for the initiating party 16 to join on the basis of factors such as the service selected, the target subject and the requesting party. The selected session will be either a pre-existing session or one created for the new call; in either case, there is an associated service instance 26 providing the service specific behaviour associated with the selected session. This first step is carried out by session initiation functionality 35 which creates a temporary initiation instance 37 for routing the requesting party to the appropriate session with the aid of session routing functionality 46. Of course, the operation of adding a party to a session is initiated by the session service instance so that, in fact, the result of the session routing step is to pass the details of the requesting party to the session service instance which then takes care of initiating addition of the party to the session. Nevertheless, it is still appropriate to refer to this routing step as a session routing step since what is of interest is the identity of the session to be joined—thus in the situation of there being more than one session associated with a service instance (as is potentially possible with complex services), the routing functionality serves to identify to which session the requesting party should be routed, the identity of the session being passed to the service instance to enable it to initiate adding the party to the right session.

The second step (which is not always needed) is to extend the participants in the communication session 11 by selecting one or more other parties to invite to the session. 11. The second step is carried out by the service instance 26 associated with the selected session.

More particularly, when a requesting party 16 selects a specific service via a web interface in their browser 29, they are passed service-specific pages 34 from a web server 33 that provides a service front-end. These pages, and associated server-side scripts and servelets, are used to collect data about the requesting party, service options, target subject etc, which is passed to a service-specific initiation instance 37 that was created (by functionality 36) in response to the initial selection of the service concerned by the requesting party. This initiation instance 37 resides on the communication session manager 14 and its identity is returned to the server 33 so as to enable data collected from the party 16 to be correctly passed back to the instance 37 (by way of example, this identity could be held in an endpoint-system-specific session object on the server 33 with session cookies, including a unique requesting-entity identifier, being used to link received HTTP requests from system 16 with the session object). The initiation instance 37 is operative first to carry out a data collection and collation task 38 to establish enough information to enable the right communication session to be selected, and (if appropriate) the right participants to be invited to join; this body of information is herein called the initiation context 40. Collecting the information necessary to complete the initiation context 40 is primarily done through the web pages 34 but may also involve lookups in a customer database 39 holding information about the requesting party, and potentially other relevant databases.

The information contained in the initiation context 40 will to some extent be service specific but will generally involve information grouped into the following data sets:

1. Requesting party. This data set is used to describe the characteristics of the requesting party. Examples are the name, e-mail address, physical address, country of origin, telephone number, gender, and profession. Other attributes could relate to preferences of the requesting party, such as an interest in sport and music. An important (though not necessarily essential) attribute of the requesting party is a unique user identifier, used by the system to identify the requesting party, and used as a key to database 39. Typically, this unique identifier is created the first time the requesting party visits the site, and identifies the requesting party for all subsequent interactions with the site (for example, it is stored on the requesting entity's system in the form of a cookie.).

2. Communication endpoint system. This data set is used to describe the communicating device 16 used by the requesting party, for example the media capabilities and name of the device.

3. Target Subject. This data set is used to describe the entity the requesting party wishes to establish a communication session with. For example, the abstract entity may simply be 'customer service representative', with additional attributes that describe a marketing campaign such as 'Vacuum cleaners'.

4. Service data. This data set is used to describe additional information required by the specific service associated with the selected called abstract entity. For the example of the 'customer service representative' abstract entity, described by the 'Vacuum cleaners' campaign, the service data could correspond to a specific product range, feature set, or price range.

5. Communication option. This data set describes the preferred communication mechanism of the requesting party. The requesting party may wish to communicate by Internet or non-Internet channel, or some combination of the two. Non-Internet channels could be telephone, or fax. Internet channels represent a variety of multimedia data types such as text or voice chat, collaborative web browsing, Internet voice and video telephony. Often the communication option is service-specific. For example, the requesting party may want to communicate with other individuals with similar interests, with a customer service representative, or with an automated bot. The communication option may relate to the immediate or future establishment of a communication session, depending on the service concerned; thus the communication option could comprise a desired future communication time, specified by the requesting party.

The sets of parameterised data, described above, are derived and collated from several sources:

Referrer URI. The URI of the page that held the link to the first service-specific web page 34 for a particular service can provide valuable information as it represents a simplification of the browsing history of the requesting party. The Referrer URL can be extracted from the HTTP header when requesting party first attempts to establish a communication session Embedded in a Web page 34. The Web page(s) 34 returned to requesting party 16 and used to request the establishment of a communication session, may contain arbitrary amounts of embedded data in the form of name-value pairs. The data may be statically embedded in the page, or dynamically generated by active server technology, such as Java Server Pages (JSP), as understood by those skilled in the art. For example, a page may contain parameters that describe high-level semantics of the page, such as the product sales campaign and a specific model number This data is extracted and passed back from the requesting-party browser 29 in the request for a communication session to the web server 33 and from there to the initiation instance 37. The data may be visible or invisible to the requesting party, the decision is made by the web site designer.

Input by the requesting party. The requesting party may be presented with an HTML form to input information about him/herself (name, e-mail address, postal address, country, telephone number, age, gender, profession, and interests), to describe the communication option required (such as text chat, voice chat, page push, shared whiteboard, Internet voice, Internet video, and PSTN telephone call), or to select the target subject.

Persistent data in requesting party browser. Information can be stored in the requesting-party browser 29 (i.e. in "cookies"), to describe or simply identify the requesting party, to maintain service state, or requesting party preferences.

Persistent information held centrally. Requesting party information (such as name, address, country, telephone number, or service subscription options) can be persistently stored in the database server 39. The requesting party identifier is used as the key to the appropriate database entries. Also of interest can be the earlier browsing history of the requesting party through the pages of an enterprise website prior to making the service request. This history is called a "wake" and is stored in a Wake Repository.

Once the initiation context information has been collected, the initiation instance 37 executes a session routing task 45 with the aid of the session routing functionality 46 (task 45 is effectively a client of the session routing functionality 46). The session routing function consists of intelligent services to analyse the initiation context and decide whether to select an existing session in the session pool 31, or to create a new session and associated service instance (this it does by instantiating a new service instance 26 of the appropriate type using service-instance factory 47, the service instance then using session factory 13 to create a corresponding communication session instance 11). An identifier of the selected service instance and session is returned to the task 45 by functionality 46.

In certain situations, the requesting party may be able to identify specifically a session to be joined by a session identifier. In such cases, the session routing task (and, indeed, potentially also the use of a session initiation instance) can be by-passed; however, the session routing task can usefully still be called upon in order to check that the provided session identifier relates to a current session.

Upon the session and service instances being identified, the initiation instance 37 hands on subsequent processing of the service request to the service instance 25; in particular, the service instance is informed that a new participant, with associated initiation context 40, wishes to join the related session. The service instance in accordance with its specific behaviour, now causes the requesting party to be invited into the selected session 11 (task 50) with the details of the party and other relevant context information being provided to the session. The mechanism, previously described, for inviting an entity to join a session is to use the appropriate session operation to add the party to the session with the session then creating a leg controller 20 through which it sends out an invitation to a connection endpoint of the target entity to invite the latter to join the session, the receipt of this invitation causing the target entity to instantiate a leg controller to converse with the session leg controller. However, since the requesting entity 16 cannot be relied upon to have the appropriate functionality to instantiate a leg controller 20 at this stage, either the passing of a joining invitation from the session leg controller must be delayed until the required functionality is provided to the requesting entity and the corresponding connection endpoint address is communicated back to the session, or else an alternative invitation mechanism must be used. In one such alternative mechanism, after the selected session 11 has created a corresponding leg controller 20, the address of the latter and the session ID (which can be in the form of a name/password pair) are passed to the requesting entity 16 (or, as will be seen, its proxy) via the communication path already established with the requesting entity through the service front end 27 (see chain-dashed arrow 51). The passing of this information effectively constitutes an invitation to the requesting entity 16 to join the session which it now does by creating a leg controller 20 and connecting with the corresponding leg controller previously established by the session 11. Leg controller functionality can be provided to the requesting entity 16 either by being passed to the entity 16 in the form of an applet from the service front end 27, or by having the latter act as a proxy for the requesting entity with the leg controller functionality being part of the proxy functionality.

The media description of the session transport associated with the selected session is now passed to the requesting entity 16 by the session (unless this was previously done when passing the session ID and leg controller address to the entity) and the requesting entity proceeds to establish appropriate media channels with the session transport instance (the latter having been previously created by the session instance 11).

Depending on the nature of the service, upon the requesting party joining the selected session, one or more further participants can be automatically invited into the session by the service instance 26 on the basis of the information contained in the initiation context 40 the current state of the selected session, and the nature of the service concerned. One typical example would be the invitation of a specialist CSR into a session in the case where the service was online contact with a CSR about a specialist topic. FIG. 6 shows the service instance as carrying out task 52 to identify an appropriate additional participant to invite to the session, this task making use of a participant resource 54 (for example, a contact center management system for identifying the next available CSR suitable to handle the subject of interest to the requesting party). Once an appropriate additional participant has been identified, that participant is invited into the session (task53). Frequently, the invited participant system is one, such as a CSR desktop system, that is preconfigured to form part of the web interaction system and is therefore provided with appropriate functionality-in particular, with persistent leg-controller instantiation functionality at a known connection address. In this case, the join invitation is issued through a corresponding leg controller 20 of the session to the known connection address of the participant system, thereby causing the instantiation of a leg controller in the participant system followed by an exchange of leg messages as already described above. The invitation includes data that describes the customer (or other participants in the communication session) so that the CSR can quickly identify the customer and the context of the call.

In certain situations, the participant to be invited into the session may be specifically identified by the requesting party. In such cases, the participant routing task 52 can be by-passed or else simply used to confirm that the identified intended participant is currently valid.

Note that although in the foregoing the selection of an additional participant was initiated by the join event of the requesting party 16, task 52 could equally well have been triggered immediately following session selection whereby the invitation into the session of the participant effectively occurs in parallel with the invitation to the requesting party. The addition of a participant may also be initiated in the course of a session by an earlier-joined participant.

The foregoing discussion whilst dealing in general terms with how any requesting party joins a session and invites a further participant into the session, concentrates on the scenario of the initial requesting party being a party (such as a customer) that has no special functional relationship with the web interaction service (and therefore needs to be provided with the means for joining the session), whereas the party being invited to join the requesting party in the session is a CSR that has functionality allowing them to be more directly invited by the session. It is worth considering further the other possibilities regarding joining/inviting into a session, namely a CSR joining themselves to a session, and the inviting in of a customer to a session. (Note that the discussion here concerns what is happening at the service level in terms of parties joining themselves to a session and inviting in others—at the level of the session instance itself, all parties are 'invited' to join session as instructed by the service instance, the method of invitation simply differing depending on the capabilities of the party being invited as described above).

If a CSR wishes to join a session without having been invited in by an existing participant, then, of course, the CSR can use the service front end (service-specific web pages) like other parties, though it is preferable to have an option which is specific to CSRs in order to avoid unnecessary data collection and to provide a way of indicating to the service instance that the party to be joined is a CSR and can therefore be invited directly through a leg controller message (due to the leg initiator functionality present at the CSR end system). However, since the CSR endpoint system is closely associated with the interaction service system, it is also possible to provide a more direct interface to the communication session manager 14 from the CSR endpoint system, by-passing the service front end; this interface could be the same interface as used by the service front end in communicating with the CSM 14 or another interface. In this case, the CSR endpoint system need only send a message to this interface indicating that the CSR wishes to join a particular session (the latter being identified either in terms of a target subject or a specific session identifier where a specific, existing, session is to be joined).

Figure 24:
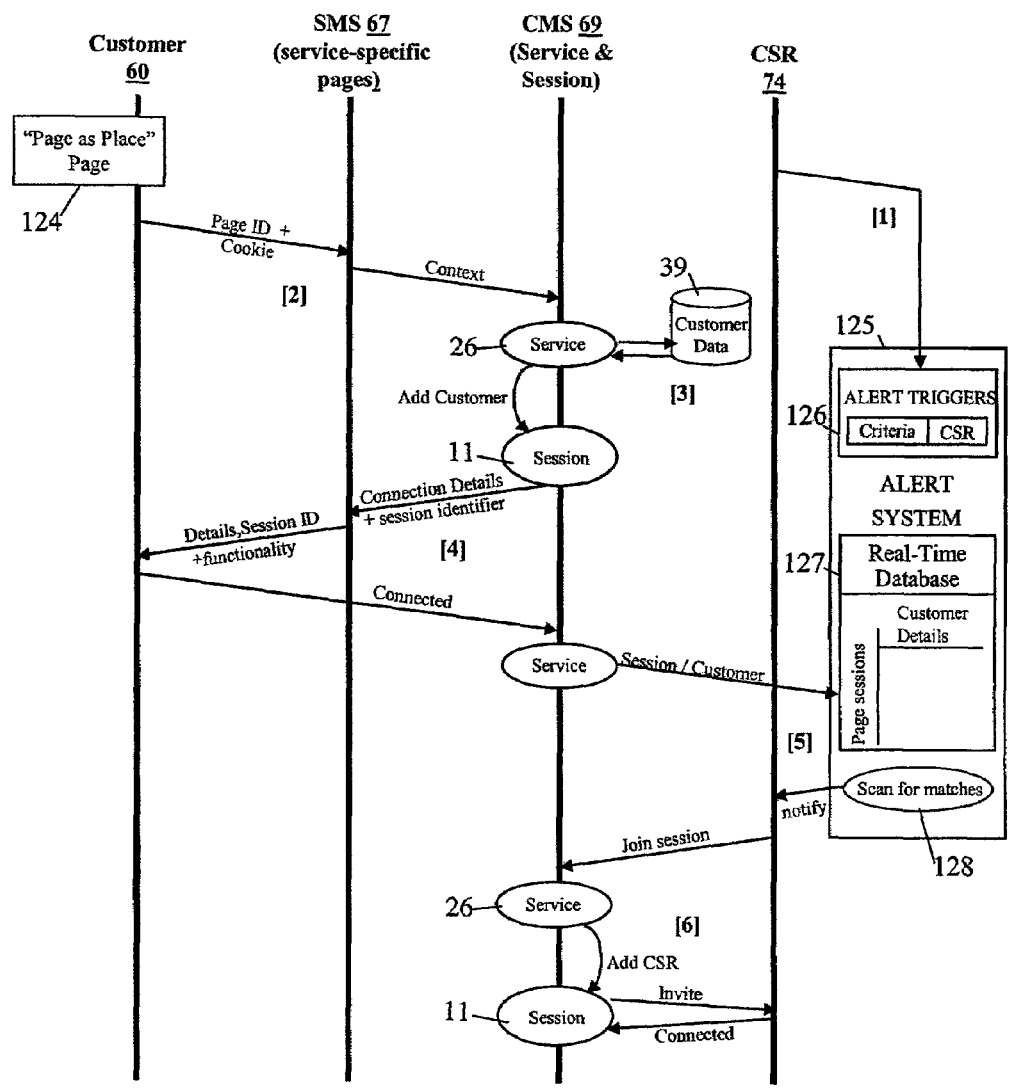
FIG. 24 is a diagram illustrating the sequence of events carried out to alert a CSR to the presence of a valued customer in a 'Page as Place' service implemented using the web interaction service system of FIG. 7.

An example situation of a CSR wanting to join a specific session without invitation is where a valued customer is noted to have just joined a "Page as Place" session being cared for by the CSR (this scenario is more fully described hereinafter with reference to FIG. 24).

As regards the inviting of a party (not a CSR) into an existing session, it will be appreciated that the problem here is that the party may not even be currently browsing the web. In such cases, some other communication channel must be used to ask the customer to link up to the web interaction service system (for example, at a 'rendezvous page') and join themselves to the session concerned, the party having been given an identifier of the session. An example of this type of situation is the inviting of a 'friend' into a "Shop with Friends" session.

After a party has joined a particular session, it may be useful for the party to be able to interact with the service instance (one example is where a CSR wishes to transfer a customer to another CSR by having the service instance find an appropriate CSR and then trigger the transfer operation of the session instance). The service front end provides one route by which session participants can communicate with the service instance (to the extent permitted by the service-specific pages and the specifics of the interface defined between the service front end and the communications session manager). In this case, the session ID is all that is needed to link any participant input to the appropriate service instance 26. This enables participants to invite further participants, such as a CSR into a session at any appropriate time, the tasks 52 and 53 being executed on the basis of existing information and any new information supplied with the invite request.

However, a second route is now also available for contacting the service instance, namely by using the leg messages exchanged with the session leg controllers to carry messages for the service instance; the details of how this is implemented will depend on the specific technology used for passing the leg messages but appropriate implementations are within the competence of persons skilled in the art. This route may only be enabled for CSRs if it is desired to tightly control access to the service instance functionality for parties who are not CSRs (the service front end being a good vehicle for providing control of what features of the service instance are accessible).

CSRs may also have a third way of accessing the service instance where the CSR endpoint systems can send message directly to the CSM interface as outlined above.

From the foregoing, it will be appreciated that the session and participant routing functionality of the web interaction system is highly flexible, allowing a requesting party to join a specific session or a session appropriate to a particular subject, and to invite in one or more specific or generically identified further participants, either at the time of joining or later during a session. The way in which a party (whether the party requesting to join a session or a party to be invited into a session) is actually invited into a session is dependent on whether the party already has the appropriate functionality for joining and participating in a session or whether that functionality needs to be provided to the party.

Specific Embodiment

Figure 7:
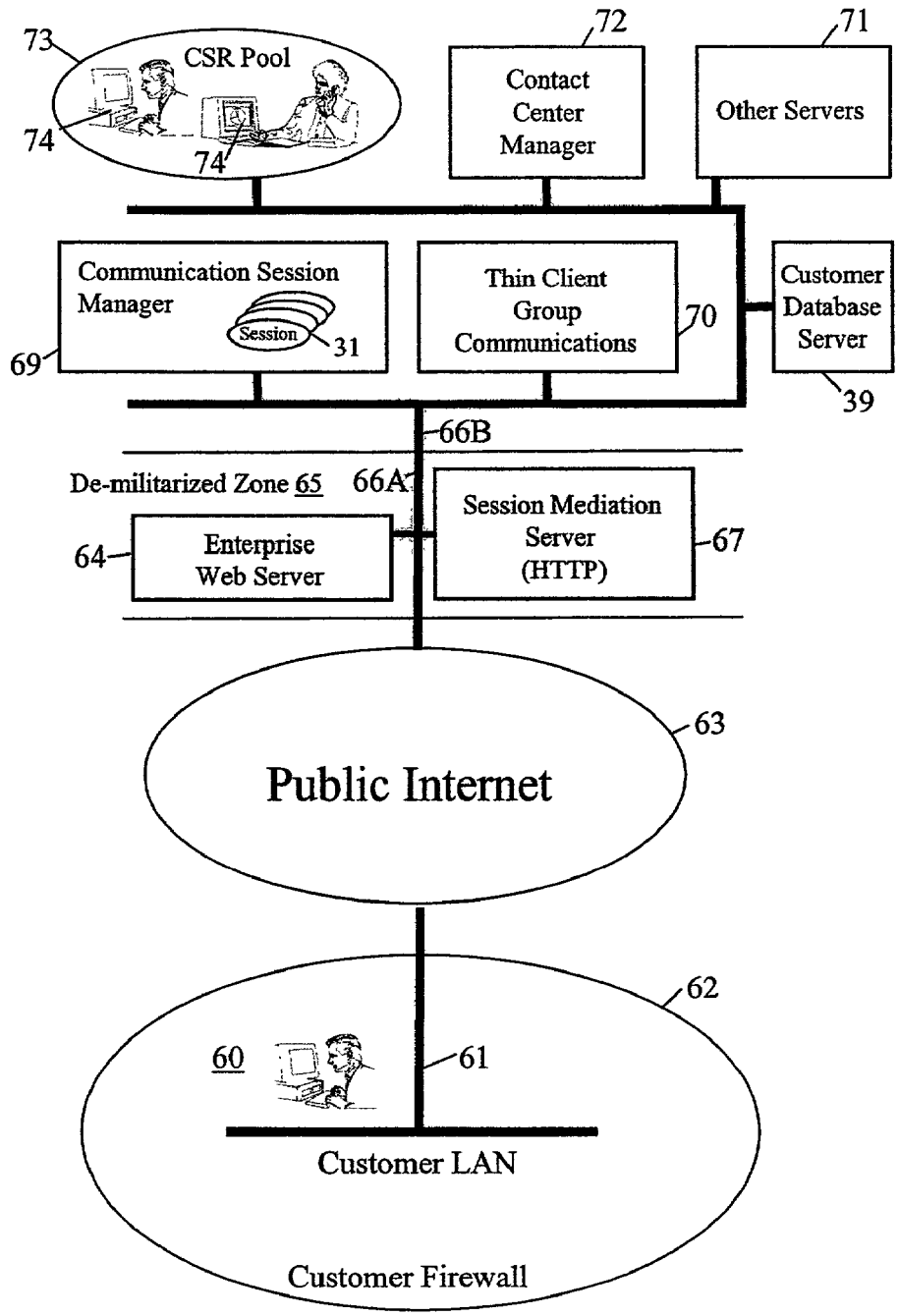
FIG. 7 is a diagram of one possible physical configuration of the web interaction system in the situation where a contact center is connected up to the system.

FIG. 7 shows one arrangement of equipment for implementing an embodiment of the above-described web interaction system in the case of a customer 60 connecting across the Internet 63 to an enterprise web server 64 and wishing to initiate web interaction services, including communication with a CSR via CSR desktop 74. As will be appreciated by persons skilled in the art, the names and quantities of servers hosting the web interaction services are shown for the purposes of illustration and clarity, and should not be read as determining a unique physical instantiation of the architecture. There are many physical configurations that can satisfy the architecture, and the choice usually comes down to non-functional criteria such as performance, scalability, reliability, security etc. However, in broad terms, it can be seen that the web interaction system comprises endpoint systems (customer and CSR systems 60, 74) that can establish multi-media communication with each other using the services of a web interaction service system 64-70 that embodies the service front end 27, communication session manager 14, and session transport manager 19 of the FIG. 3 layered functional diagram.

More particularly, the customer has a desktop system (for convenience embraced by reference 60) which is connected to a LAN 61 located within a customer firewall 62. It is common in many organisations to use a firewall to isolate the private internal network from the public Internet for security reasons. The customer 60 could be a domestic consumer connected to Internet 63 via an Internet Service Provider (ISP) or it could be an employee of an organisation with a high level of internal security, such as a bank or a hospital. The customer 60 is connected through the customer premises firewall 62 to the Internet using the standard Internet TCP/IP protocol, and the customer has World Wide Web access using the standard Hypertext Transfer Protocol (HTTP).

The enterprise web server 64 is connected to enterprise LAN 66A which connects to Internet 63. Web server 64 resides within the so-called "demilitarized zone 65" of the enterprise, this being a ring-fenced LAN which includes equipment that is controlled by the enterprise but is accessible to the outside world as well as to equipment on the secure part of the enterprise network (LAN 66B) that exists behind a firewall.

In browsing the pages served by the enterprise server 64, the customer decides to request an offered web interaction service and indicates this by an appropriate selection action that results in a corresponding HTTP request message being sent to the web interaction system, the front end of which (functionality 27 of FIGS. 3 and 6) is embodied in a session mediation server 67 that also lies within the DMZ 65. Other equipment components of the web interaction system include a Communication Session Manager (CSM) server 69 providing the functionality of the communication session manager 14 of FIGS. 3 and 6, and a Thin Client Group Communications (TCGC) server 70 providing the session transport functionality 19 of FIG. 3 ("Thin Client" is used to refer to the approach whereby most of the functionality resides in a server). The servers 69 and 70 both reside behind the DMZ 65. More details of the implementation components of the FIG. 7 web interaction system are given below.

Thin Client Group Communication Server 70—This component can be implemented, for example, using Sun's Java Shared Data Toolkit (JSDT). One or more TCGC servers 70 can be instantiated, to provide scalability. The TCGC server exports a simple interface to the session transport factory 18 (FIG. 3) to allow other functional entities to create and destroy new session transports. The session transport is created with a set of authorisation parameters which are passed across the factory interface. In the current embodiment, session instances 11 residing on the CSM server 69 are the only authorised clients of the session transport factory interface.

The session transports 15 provided by the TCGC server 70 are centrally managed. The TCGC server is responsible for authenticating entities that attempt to perform operations on the session transport 15, channels 17 and channel endpoints 22. In particular, session transport creation and destruction, creating or obtaining a reference to a channel, and binding a channel endpoint to a channel, are all operations that need to be authenticated by the TCGC server 70. The TCGC server has full knowledge of the set of channels 17 created in a session transport, and the set of channel endpoints 22 bound to the channels.

Communication between channel endpoints 22 is implemented using a unicast transport. The originating channel endpoint 22 sends data to the TCGC server 70, and it is the server that forwards the data on the unicast transport to each of the destination channel endpoints 22 for the channel concerned.

Communication Session Manager Server 69—The CSM server 69 provides the platform on which the functionality is deployed to create and manage communication sessions and their associated service instances. The realisation of the initiation instances 37, service instances 26, communication sessions 11, communication session factory 13, and server-side leg controllers 20 are part of the CSM. The CSM holds the definitive view of the communication session state.

In the current embodiment, the CSM offers a Java RMI remote interface to allow Java Servlets running on the SMS (see below) to create and communicate with instances of the services deployed on the CSM.

Session Mediation Server 67—The Session Mediation Server (SMS) 67 is a web server that hosts the set of service-specific pages that present the GUI to allow a requesting party to request connection to a service-specific communication session concerning a target subject. The GUI allows the requesting party to select a service, enter personal information, select a communication option, and describe the entity to communicate with. In the current embodiment, the server is, for example, an Apache Web Server (http://www.apache.org) running the Jserv (http://java.apache.org) Java Servlet environment. Java Servlets running on the CSM server are used to parse WWW forms and validate customer inputs, and these servlets use the above-mentioned RMI interface to the initiation and service instances running on the CSM to satisfy the communication requests of the requesting party.

Other Components—The web interaction system also includes other components connected to the enterprise LAN 66B, these being a customer database server 39, additional information servers 71, a contact center management server 72 for providing the CSM 69 with information regarding the availability of CSRs in CSR pool 73 (the CSRs and their desktop systems being indicated by references 74 in FIG. 7)

Interaction Scenario

Figure 8:
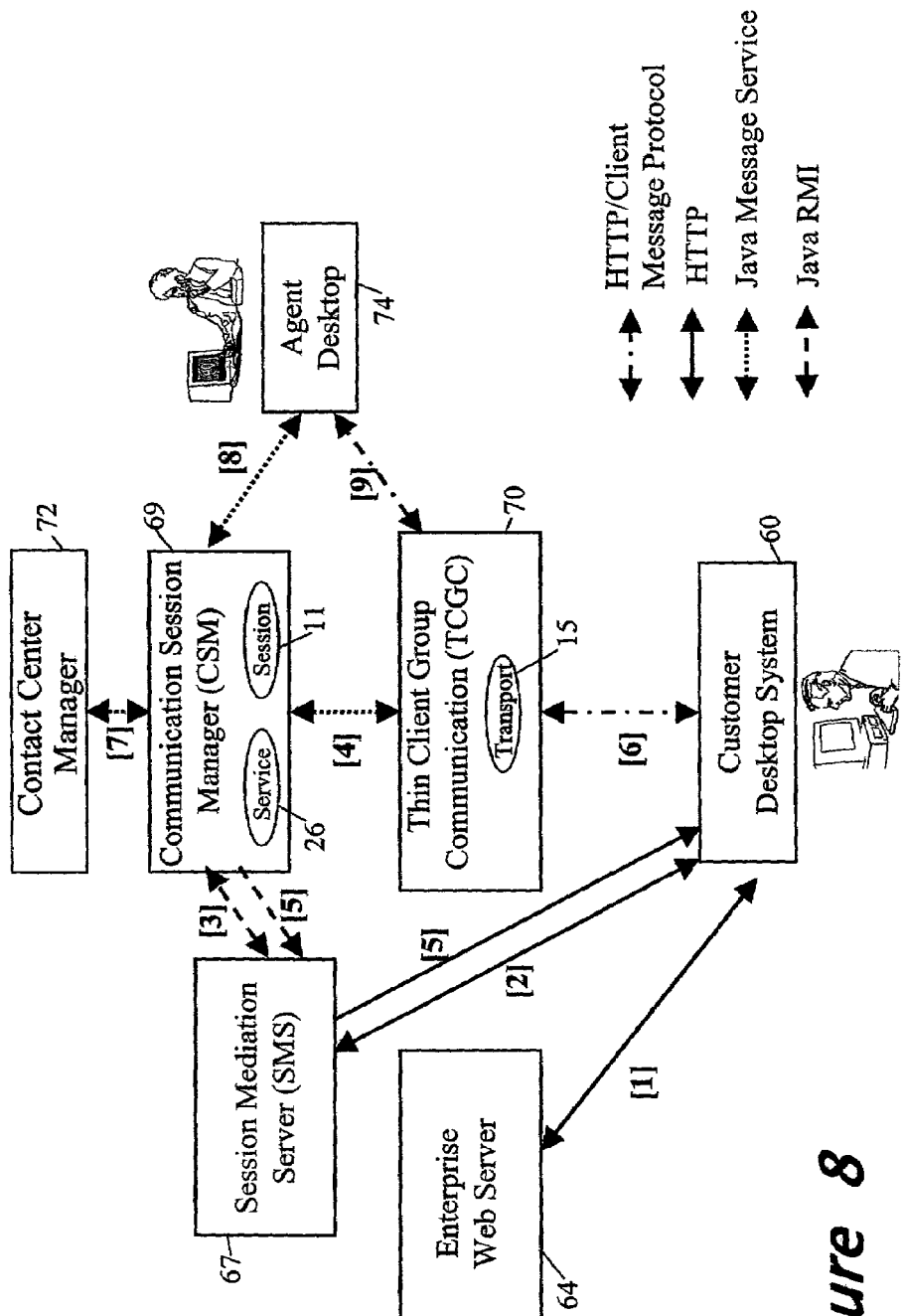
FIG. 8 is a diagram illustrating the interactions between the components of the FIG. 7 system upon a customer seeking to contact a call-center customer service CSR.

FIG. 8 depicts the communication protocols used between the above-described system components. These protocols include the following, all are layered on top of the standard TCP/IP protocol:

Hypertext Transfer Protocol (RFC1945). This is the protocol used by WWW browsers to access WWW servers for the purpose of providing the WWW service. This protocol is the lowest-common-denominator means for customers to interact with the web interaction system, and it can be transported securely across corporate firewalls. The customer desktop system 60 uses this protocol to communicate with the enterprise web server 64 and the SMS server 67.

Java Remote Method Invocation (RMI) (see http://java-soft.sun.com) is a well known protocol used to invoke methods on remote objects in distributed systems. It is here used between the SMS server 67 and the CSM server 69 for invoking service and session initiation operations provided by the CSM.

Java Message Service (JMS) (see http://javasoft.sun.com) is a public specification for inter-computer messages which has been widely implemented to disguise various proprietary protocols, and is a convenient way to specify and implement interactions between the CSM 69 and TCGC server 70, as well as between the CSM and back-end servers such as databases 39 and 71, call centre manager 72, and CSR desktop applications 74.

The following scenario illustrates the use of these protocols during the initiation of a basic and familiar service where a customer 60 browsing the WWW wants to contact a CSR 74 to ask questions. The service takes information about the customer, creates a communication session, invites the customer into the session, locates an available CSR, invites the CSR into the session, and once both parties are in the session, they can begin to interact using various media. The general interactions involved are referenced [1] to [8] in FIG. 8 and are as follows:

[1] The customer 60 is browsing the enterprise WWW site on server 64 (using HTTP protocol) and wants to talk to a CSR 74 about some issue. The customer finds a "help" button on the WWW page currently being viewed and clicks on it. This button is a hyperlink to a WWW page on the Session Mediation Server 67.

[2] The customer goes through various hypertext/WWW dialogues on the Session Mediation Server (SMS) 67. This involves selecting various communication options, and the customer supplies a small amount of personal information. The servlet running on the server 67 also extracts information about the customer in the form of "cookies" and other information from the HTTP header request, as already described.

[3] The SMS 67 condenses all the information about the customer in the form of a Java object and communicates it to a service-specific initiation instance on the CSM using the Java RMI protocol (as an alternative to passing all the required information in one go, this can be done progressively as the SMS collects information). There may be additional communication (using the JMS protocol) between the SMS/CSM and external database 39 containing customer information, so that the information presented to the customer can be personalised according to the past history of interactions.

[4] The initiation instance on CSM 69 causes the creation of an empty communication session 11, with associated service instance 26, for the customer. The session instance 26 communicates (using the JMS protocol) with the TCGC server 70 to create a session transport 15.

[5] Information about the session (including session identity) and the session leg controller corresponding to the customer are then returned via the SMS to the customer along with the customer interface to the session (including leg controller functionality and the other functionality to be a member of a session) as part of an HTTP response (i.e. a WWW page containing active content such as Java or Javascript). In this way the customer loads a WWW page which contains information about the selected session transport.

[6] The customer system 60 joins the session 11 by using the leg controller functionality passed to it to contact the corresponding leg controller on the CSM server 69. Because of the difficulties involved in traversing the customer's firewall, the leg messages passed between the leg controllers actually use the same transport mechanism as employed for the media channels, namely a firewall traversing protocol, such as that described in our co-pending patent application GB 9920834.0 filed Sep. 4, 1999, depicted by a chain-dashed line in FIG. 8. Indeed, the leg messages can conveniently be passed across a channel established for this purpose between the customer end system and the session transport 15. To this end, the media description is passed to the customer system along with the session identity via the SMS whereby the customer system can establish communication with the session transport 15 using a firewall-crossing protocol and set up a channel to pass the leg messages as well as the required media channels for each of the media types in the session.

[7] The service instance 26 on CSM 69 interacts with the contact center manager 72 (using JMS) to select an available CSR.

[8] The service instance 26 causes the CSR desktop system 74 to be invited to join the session, the invitation being issued through the relevant session leg controller using the JMS protocol. This invitation contains customer information.

[9] If the CSR accepts, the CSR desktop system 74 joins the session transport using the same protocol as the customer desktop system.

At this point, both the customer and CSR can exchange information using media channels created as elements of the session transport 15. The CSM 69 monitors the status of the end system participation in the session transport via the leg controllers, and when either customer or CSR leave, it tears down both the communication and session transport.

Although in step [5] above, the SMS is described as passing the customer system the functionality needed to join and be a member of a session, as a collection of Java applets and Java packages in a WWW page, this functionality could be retained at the SMS with the latter acting as a proxy for the customer system and only serving to that system WWW pages that reflect the service/session state as known to the proxy (see "Lite Desktop" description below).

This physical infrastructure is capable of supporting many service scenarios such as those described above.

Endpoint System Desktops

Examples will now be given of GUI desktops suitable for a CSR endpoint system 74 and a customer system 60, these desktops being the visible expression of the functionality described above. In particular, the desktops provide interfaces for the media channels associated with a communication session as well as web interfaces to the web interaction service 26 concerned; additionally, the CSR desktop provides tools for managing multiple "calls" (communication sessions).

CSR Desktop (FIGS. 9-17)

The CSR Desktop 80 is the CSR's sole point of interaction with web channel calls but may be used in conjunction with other channels, e.g. telephony, to offer richer service, e.g. voice and page push. A CSR is associated with one or more campaigns which are a way of breaking down a customer service problem space into smaller logical areas; typically, a specific campaign will constitute the target subject matter of a customer service request. A campaign is also a means to organize CSRs into skillsets—it is an administrative mechanism with explicit support in the contact center management system so that a single contact center functions as a set of smaller virtual contact centers, each with a defined topic focus.

Figure 9:
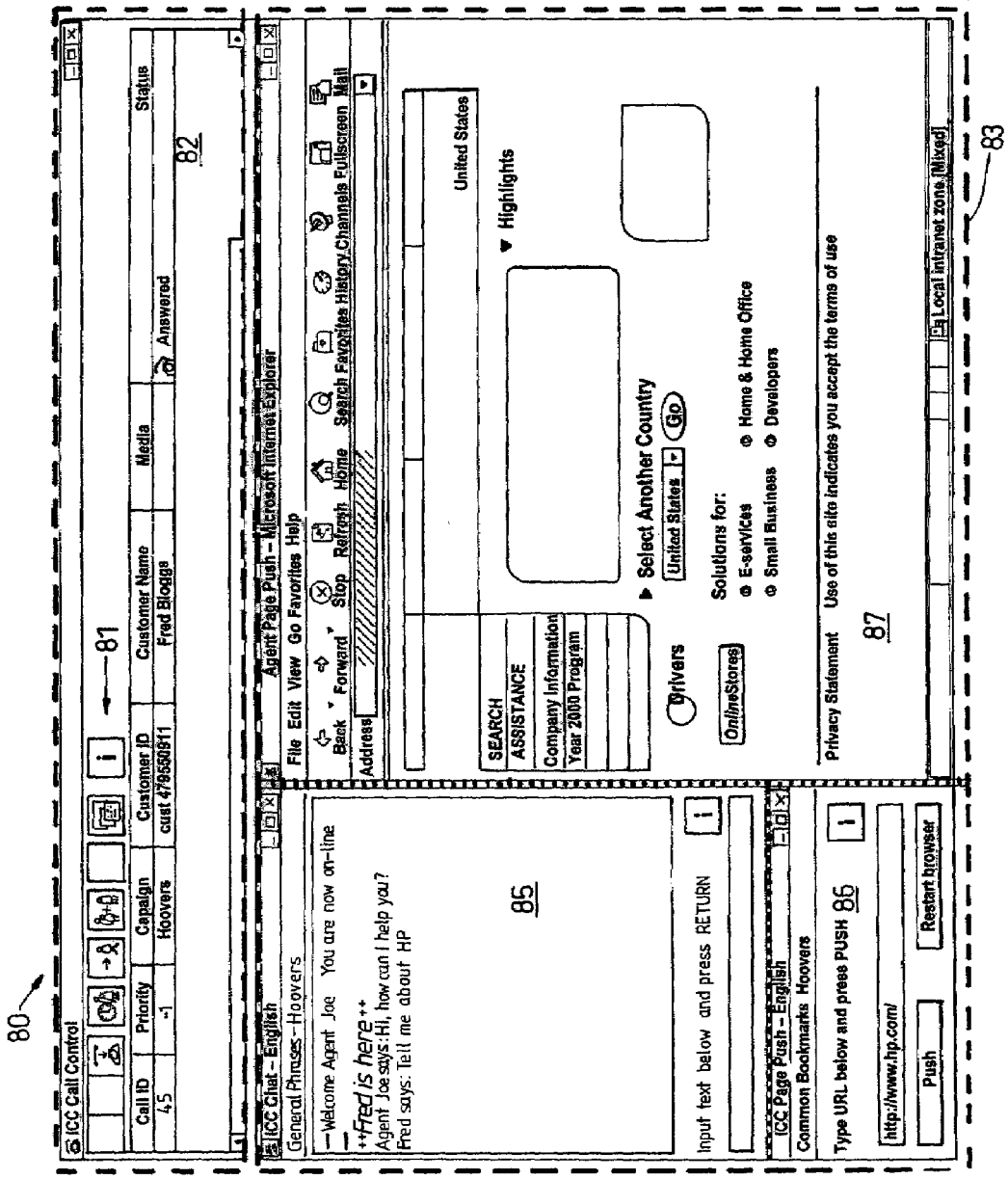
FIG. 9 illustrates a customer service CSR (CSR) graphical user interface (GUI) desktop, the desktop having both a call-management GUI component for managing multiple calls, and customer-interaction GUI component for interacting with a specific customer.

In telephony, interaction between a customer and CSR is swift and if the CSR wishes to split their attention between two or more calls, they must put one of the calls on hold, thus breaking the appearance of dedicated service. With the web channel, interaction can be less intense, e.g. if the customer is not familiar with a keyboard, and there is opportunity for an CSR to multi-task between a number of calls. To support the illusion from the customer's perspective that the CSR is giving them dedicated service requires a CSR desktop GUI component that enables the CSR to manage the information and media associated with each call quickly and effectively. FIG. 9 shows an example CSR desktop GUI 80 with a call-management component 82 that can be used by the CSR to receive incoming calls and manage calls that they are already dealing with. Each call (a session that the CSR is invited to, is currently involved in, or has recently left) appears as a row in a table containing relevant information such as customer name, customer ID, the campaign this call belongs to and the status of the call. To interface with a particular call, the CSR selects the row containing the call details (and possibly is also required to press an appropriate button).

The call management component 82 includes a set of high-level control buttons 81 for choosing actions such as accepting/rejecting an invitation to join a session, disconnecting from a call, transferring the call to another CSR and conferencing in another CSR The CSR desktop 80 also comprises a customer-interaction component 83 with respective GUI sub-components for each of the media types that the desktop 80 is intended to handle (albeit that not all media types are present in all calls). These GUI sub-components are generically called media-type windows below with the sub-components associated with a specific media type being referred as that media-type window. In the FIG. 9 example, a text-chat window 85 is shown together with a page-push window 86 and a browser window 87 (the latter two windows both being used for a page-push channel, the browser window showing the page at the last-pushed URL as displayed in the page-push window 86). Upon a call being selected in the call-management window 82, the media clients established for the call are linked to the corresponding media-type window.

Figure 10:
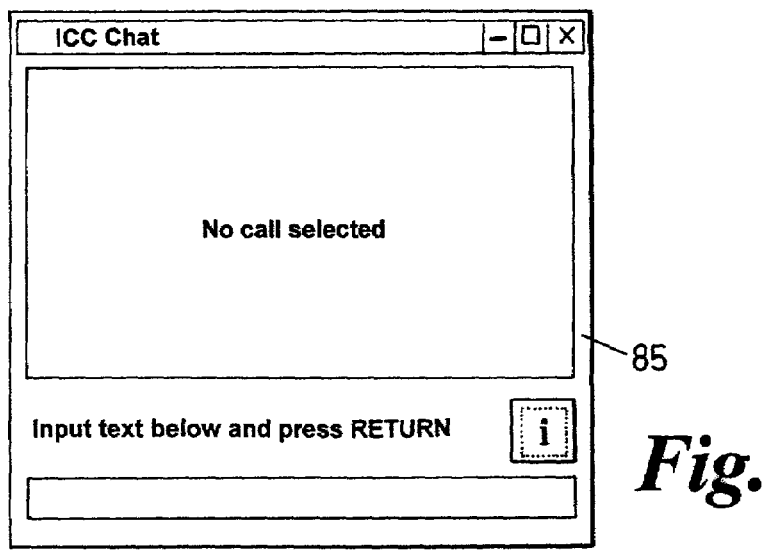
FIG. 10 shows a text-chat GUI sub-component of the FIG. 9 customer-interaction desktop component when no call is selected.
Figure 11:
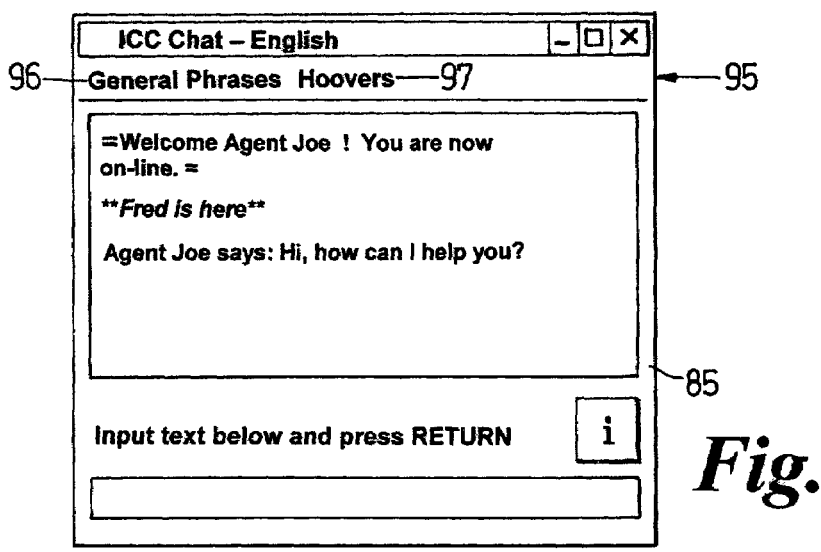
FIG. 11 shows the text-chat GUI sub-component during use for a selected call.
Figure 12:
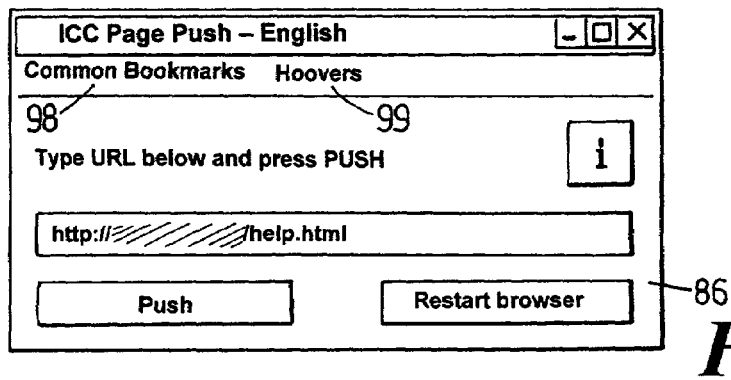
FIG. 12 shows a page-push GUI sub-component of the FIG. 9 customer-interaction desktop component.

Example media-type windows are shown in FIGS. 10-12. More particularly, FIG. 10 shows a text-chat window 85 in the case where no call has been selected, whereas FIG. 11 shows the same window 85 when a call, with previous chat dialogue, has been selected. FIG. 12 shows the page-push window 86.

Figure 13:
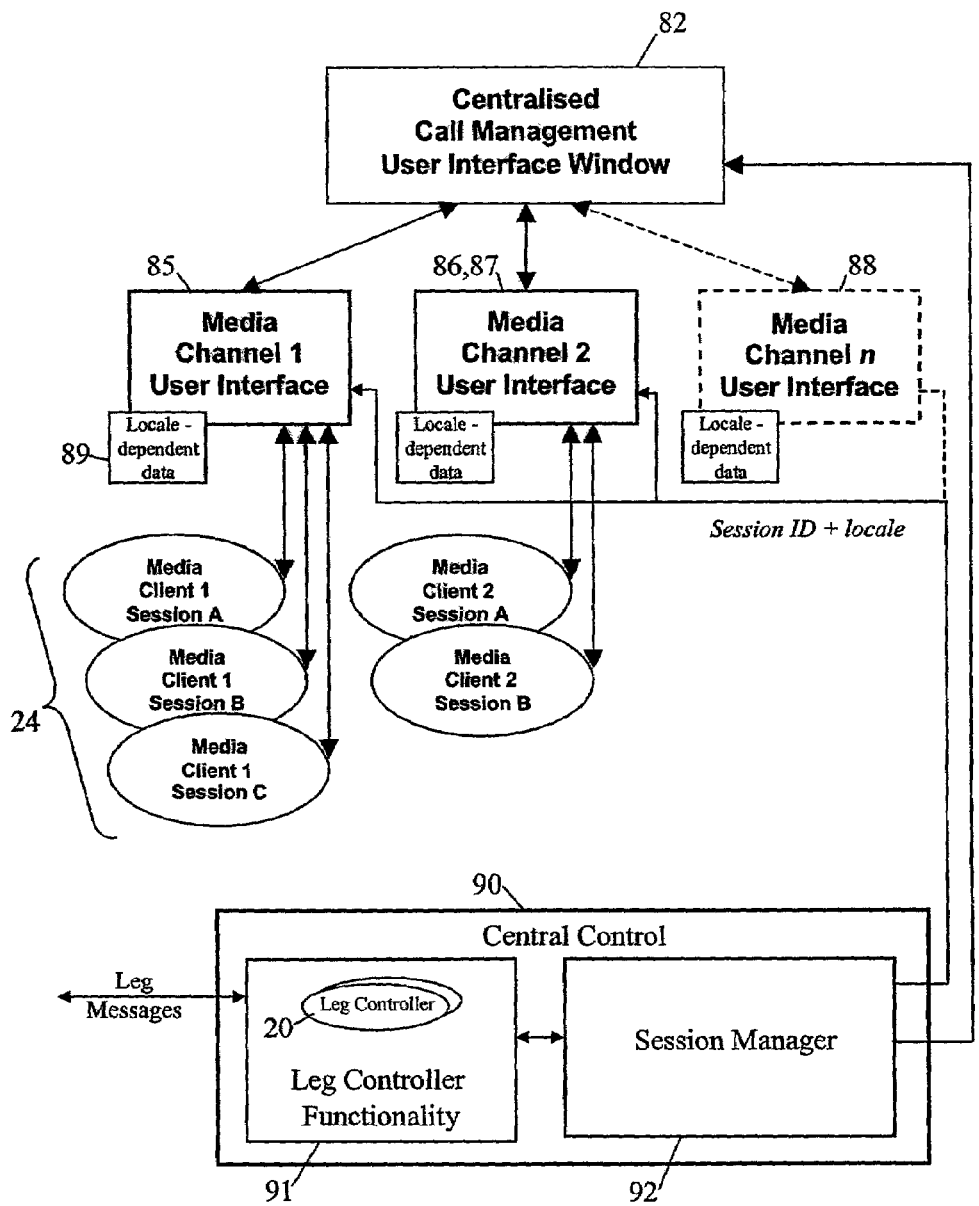
FIG. 13 is a diagram illustrating the functionality of the CSR desktop.
Figure 14:
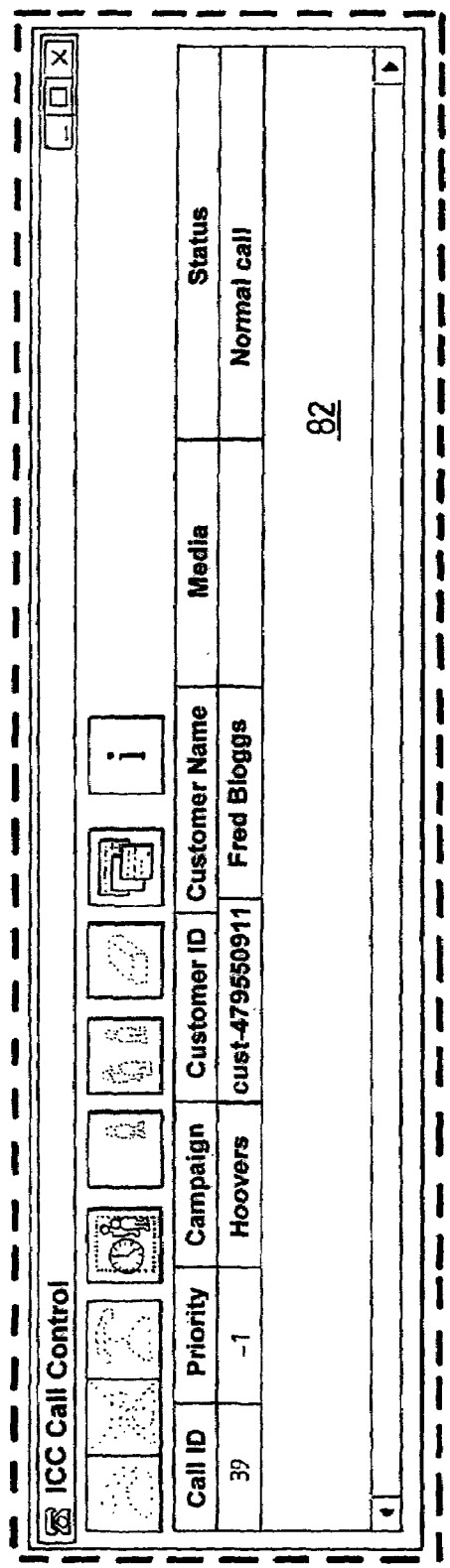
FIG. 14 shows the FIG. 9 call management desktop component showing a new call.
Figure 15:
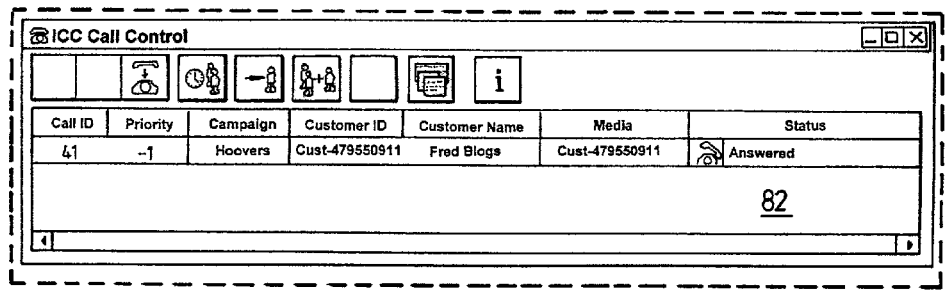
FIG. 15 shows the call-management desktop component upon a second call being answered by the CSR.
Figure 16:
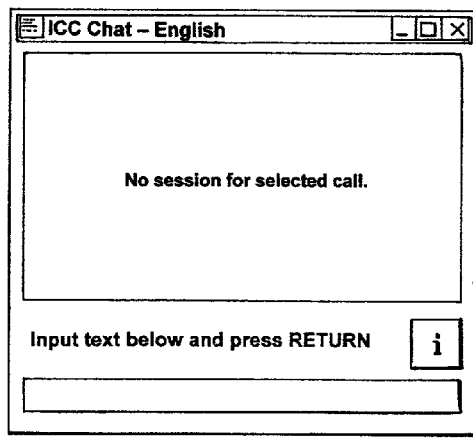
FIG. 16 shows the text-chat GUI sub-component when no media channel of this type is present for the selected call.
Figure 17:
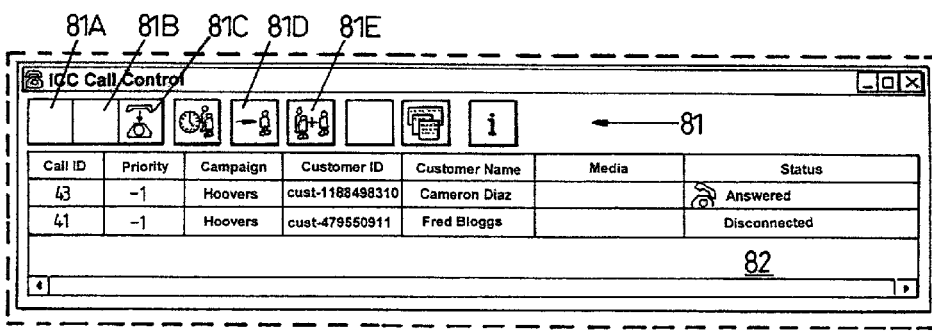
FIG. 17 shows the call-management desktop component upon a call being dropped.

FIG. 13 depicts the general arrangement of functionality supporting the CSR desktop 80. A central control block 90 comprises leg controller functionality 91, and a session manager 92 for managing the sessions in which the CSR desktop system is involved. When the leg controller functionality 91 receives a leg message inviting the CSR desktop system to join a session, it creates a corresponding leg controller in the alerting state and causes the session manager to create a new line in the call management window 82. This line is emphasised in some manner (e.g. shown in red) to alert the CSR to the invitation (see sole line in the call-management window depicted in FIG. 14). Upon the CSR accepting the call by selecting the line and clicking an accept button, an appropriate icon is added to the status field of the call line (see FIG. 15) and the session manager 92 instantiates media clients 24 for the media types indicated in the media description of the session. These media clients then set up corresponding media channels to the session transport as already described. The state of the leg controller passes to 'connecting' during channel set up and then to 'established' once the channels have been set up.

For whichever session is currently selected (the currently selected session is highlighted in blue with only one call being in a selected state at one time), the session manager causes the media-type windows 85-88 to display the output of the corresponding media channels of the selected session. Each user interface function is disabled or enabled depending upon the status of the currently selected session to ensure that the user is only presented with the options relevant at any given moment; in particular, if a particular media type is not required for a selected session this is clearly indicated and the relevant window controls disabled (see FIG. 16 that shows the text chat window 85 when not being used for a currently-selected session).

While dealing with one call, some new content may appear on the media channels associated with one of the other calls being handled by the CSR. When this occurs, an icon representing the media type of the new content is displayed in the call table's media column. This simple mechanism enables a CSR to concentrate on interacting in one session in the safe knowledge that they are not missing input from another customer. As soon as the media icon(s) appear, they can select that call and check what has happened, making a response as necessary (when a call is selected, all media icons are cleared from the call's display). Using this process, a skilled CSR should be able to handle a number of calls simultaneously.

When the customer or CSR drops the call, the call details do not disappear immediately. Instead, the call table entry remains (see second row in the call management window 82 shown in FIG. 17) and, if the call is selected, the media-type windows can be used by the CSR to review the content generated when interacting with the customer. When the CSR is happy that they have captured all the information they need, the call can be removed from the call table and the media content is lost forever (unless archived).

Scripts—CSRs often have to deal with the same types of enquiries over and over again. To extract the most relevant information as efficiently and as quickly as possible, a CSR will often ask a series of predefined questions. These are commonly placed into written scripts which are either followed from top to bottom, or sampled as necessary. When using telephony this is sufficient. However, when presented with a medium of interaction such as text-based chat, the CSR is required to type repetitive phrases and questions in addition to the usual conversational pleasantries. The menu bar 95 in the FIG. 11 text-chat window 85 shows two scripts that are represented by pull-down menus 96, 97. The first menu 96 (labelled "General Phrases") contains commonly used phrases such as "Hi, how can I help you?", and so on. The second menu 97 (labelled "Hoovers") contains questions that are specific for the campaign related to the call, e.g. "Hoovers". As a CSR flicks from one call to another, the correct campaign script is automatically displayed in the text-chat GUI.

Similar pull-down menus 98, 99 are also available in the page push window 86 (see FIG. 12) and contain URLs in much the same way as browser provide a bookmark facility. These URLs are again ordered for general campaign-independent use (menu 98) and campaign-specific relevance (menu 99). Selecting one of these URLs will push the page to the session.

A CSR in using the script-enabled text chat and page push windows to show a customer around a product, for example, would say (type in the text chat window 85) something or choose an entry from a script menu, and then select the appropriate URL from one of the menus 98, 99 in the page-push window 86. It is also possible to arrange for the selection of particular text-chat script entries to automatically cause a corresponding URL to be sent to the page push media client of both the CSR and customer.

The above-described use of predefined selections, as well as their linking together across media types, can be applied to all media clients, whereby a multimedia presentation is effectively scored by the selection of script items.

Languages—In addition to being assigned to one or more campaigns, a CSR may also be multi-lingual and capable of dealing with enquiries in multiple languages. The country and language (together making a "locale") of the party requesting contact with a CSR is captured with the other data about that party and is passed via the SMS and CSM to the CSR desktop as part of the inviting leg message from the session leg controller to the central control block 90 of the CSR desktop. If the CSR chooses to accept the web call, then this information is saved by the central manager 90. Whenever the relevant session is chosen by the CSR, the session identity and locale is passed to the media channel user interfaces 85 to 88 to enable session-dependent portions of these interfaces to be adapted to the locale of the currently selected session on the basis of locale-dependent data 89 accessible to the interfaces. Thus, by way of example, in the case of the text chat window, the menu bar 95 will display script names and their contents in the appropriate language. Session-dependent parts include character sets, date/time conventions, scripts or other pre-defined content intended to be pulled in during the session, and so on. Those parts of the media channel user interfaces that are not session-dependent are always presented in the CSR desktop locale as is the call management component 82. The CSR desktop locale can be selected to be either the chosen default locale of the call centre, or the CSR's native language.

Pre-defined, locale-dependent content, e.g. scripts, can be pulled in at run-time if the CSR desktop receives a session from a locale for which it does not have the appropriate session-dependent data. This allows the allocation of multi-lingual CSRs to change at run-time.

The initial capture the locale of the requesting party can be done in any appropriate manner. For example, where the requesting party initiates contact by clicking on a help button appearing on a web page on the enterprise server 64, then the locale information can be associated with the button and passed to the SMS 67 for incorporation in the session context; if the website is split into language specific regions, then there is only need for one help button on a page, whereas if there are no specific regions in the site, then multiple help buttons can be provided, each one coded for a different locale. Of course, locale information could simply be captured along with other participant data as part of a form-based dialogue after the help button is pressed. Another way of obtaining locale information is for the SMS or CSM to use customer identity information to look up locale information for the customer in a customer profile database.

Whilst the locale information is described about as being passed to the CSR system at the time the latter is joined to a session, where the CSR is first into a session, the locale information of a subsequently joining customer could be passed to the CSR system at the time the customer joins. An alternative is to arrange for the session or service instance to supply the locale information only upon selection of a session by the CSR using the call management component 82.

As well as benefiting CSRs in contact centres, the dynamic adaptation of interface elements to locale can be applied to the application of the web interaction system to situations such as moderating a virtual community or an online training class.

Call Operations—Control buttons 81 (see FIG. 17) make available the following basic call-handling functions to a CSR:

Answer—(button 81A) Accepts the selected call and connect to the session.

Decline—(button 81B) Refuse the selected call such that another CSR will be selected to take it.

Drop—(button 81 C) Used when CSR has finished dealing with the customer.

Transfer to CSR—(button 81D) Transfer the call to another specified CSR. If the receiving CSR accepts the call the desktop waits until all the receiving desktop's media clients are connected before automatically disconnecting their own for that call.

Conference to CSR—(button 81E) Sometimes, a CSR may wish to conference in another CSR, for example one with more knowledge on a certain matter. If the receiving CSR accepts the call, then the session is extended to include that CSR's media clients. As long as there is one CSR dealing with the call, the communication session will remain open.

Clicking a control button 81 results in the session manager 92 initiating the appropriate action, including the sending of leg messages to the CSM server 69 to notify the session instance 11 of a change of communication state of the CSR desktop system (for Answer, Decline, Drop actions), and the sending of messages to the service instance 26 to add/remove participants (Transfer/Conference actions).

Customer Desktop

The customer endpoint system 60 provides a customer desktop interface for interfacing the customer with the service being provided by the web interaction system. The following description of the customer desktop relates to the specific case of a desktop configured for customer-CSR interaction and it will be appreciated that for other service scenarios the precise details of the desktop will vary to suit the service.

The customer desktop typically proceeds through the following connection states that are reported to the communication session manager in leg messages:

an initial state entered on launching of the desktop and ending when an invitation is received and accepted from a session;

a connecting state between acceptance of the invitation and when the appropriate media clients have been set up and media channels established to the session transport;

an established state made up of a routing sub-state lasting whilst a CSR is being found and invited into the session, and a conversing sub-state lasting whilst the customer and CSR are both connected to the session (the leg messages only report the established state and not its sub-states);

a disconnecting state, and a final state.

The CSR may transfer the call to another CSR. If this happens the customer desktop is informed and the customer informed so that they do no anticipate any further interaction until the call has been successfully transferred.

As with the CSR desktop, the customer desktop preserves the relevant media content, e.g. the chat transcript, after a call has terminated so the customer can review the information they gathered after the CSR has disconnected.

The Customer Desktop is composed of two layers: one providing service-level logic and functionality (the service interface 29 of FIG. 3), the other implementing the media clients with their graphical user interface. Two functionally similar embodiments of the customer desktop are described below, namely:

an applet-based customer desktop ("ACD") implemented, for example, using Java applet technology; the ACD requires downloading to the customer endpoint system and carries out media channel processing on the customer desktops; and a proxy-using customer desktop (the "Lite" customer desktop, LCD because no download or extensive processing is required on the client side, the processing being done in a proxy provided in the SMS 67).

Applet Customer Desktop (ACD)

Figure 18:
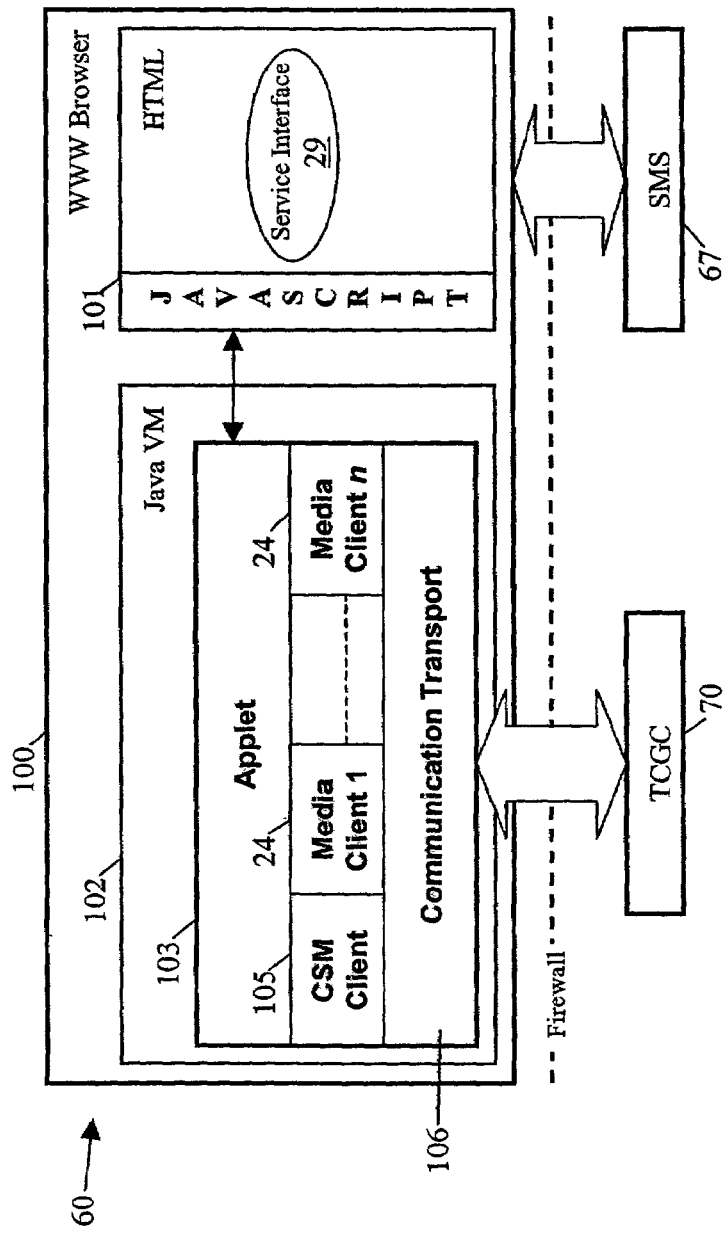
FIG. 18 is a diagram of a customer GUI desktop based on applet technology.

The general functional structure of the ACD is shown in FIG. 18 and, as can be seen comprises a web browser 100 in which standard HTML pages (with embedded JavaScript) provided by the SMS 67 provide the service interface 29, whilst the browser's Java Virtual Machine 102 runs a downloaded applet 103 to offer a richer interface to the web interaction system.

The ACD is launched when the SMS 67 serves an HTML page containing the applet to be opened in the customer's web browser (this is normally done after initial information has been collected, using HTML forms, by the service front end running on the SMS 67). The parameters for the HTML applet tag specify session information needed to initialise the desktop and connect to the session leg controller (on CSM 69) and the session transport TCGC server 70, these parameters typically including:

Customer identifier.

Nickname (from the form filled in by the customer prior to desktop launch).

Language the customer requested to receive service in.

Address of the communication session associated with the call.

The response to be given when challenged by the TCGC upon joining the session.

The media description for the given session.

The first action performed by the applet 103 is to interpret the media description and create a media client 24 for every media type contained therein. All the media clients 24 are connected, via transport layer 106, to the session transport at the given address and use the given response when challenged. At the same time, a single CSM client 105 is created and a connection with the CSM established, via the session transport 15, for the passing of leg messages to communicate connection state information to the session instance 11. As already indicated, the transport layer 106 preferably implements a firewall-crossing protocol.

The ACD's user interface is initialised so that input and output are suitable for the specified language and media GuIs created for the respective media clients. In this way, the user interface only contains those GUI elements that are strictly necessary for a given call.

The ACD uses an interface defined in Javascript to perform operations on and reflect certain events into the HTML document containing the applet. These events can be used for synchronising web content with the desktop. Just as the applet uses Javascript to access the HTML document, so Javascript can be used by the document to access the external interface of the ACD, e.g. get the current state of the desktop. For example, where a page-push media client is instantiated, this can cause the opening of a browser window to be used to displaying the pages pushed by the page push media client. Upon receipt of a new URL from the page push channel, the page push media client invokes a Javascript method to display the URL in the page push window.

Lite Customer Desktop (LCD)

Figure 19:
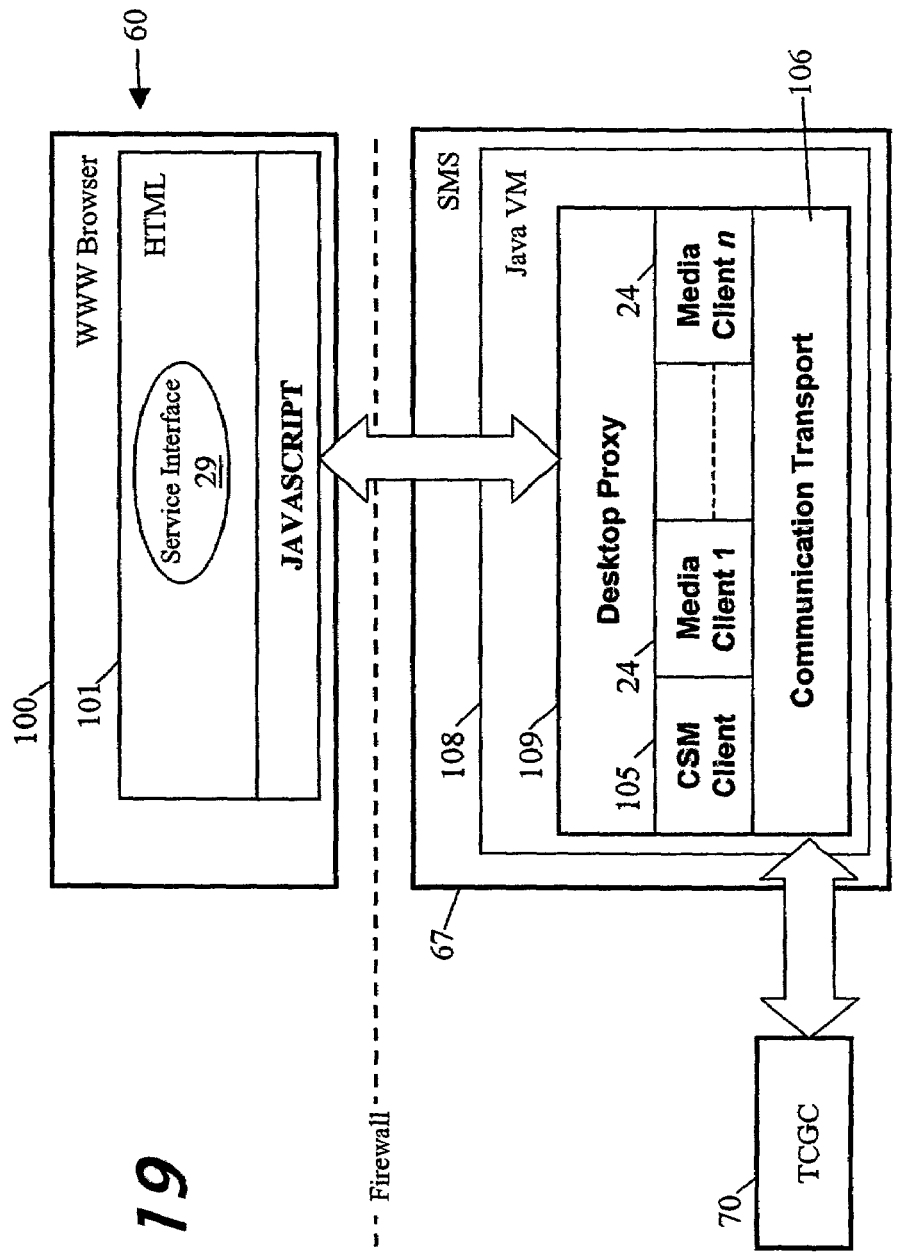
FIG. 19 is a diagram of a customer GUI desktop based on the use of a desktop proxy provided by the web collaboration service.

The general arrangement of the LCD and associated proxy is shown in FIG. 19. The LCD uses HTML and Javascript in the web browser 100 and locates the media-client and leg-controller functionality 24, 105 in the SMS 67 (again, this functionality can be implemented using Java code 108 running in JVM 109). When the LCD is launched (done by the SMS 67 serving the appropriate HTML pages to the customer system 60), a desktop proxy process 109 is created in the SMS that connects to the TCGC 70 to set up the required media channels and interacts with the session leg controller on the CSM 69. The LCD forwards any user input, e.g. chat message, page to push, etc., to the proxy 109 and polls it using an HTTP request for client updates, e.g. change in desktop state, new chat messages, page to display, etc.

Whilst the media clients for the LCD are located at the SMS, the media channels effectively extend to the customer desktop itself.

Further Interaction Scenarios

FIG. 8 depicted the main operations involved in setting up a 1:1 session between a customer and CSR using the FIG. 7 web interaction system. The FIG. 7 system is capable of handling significantly more complicated scenarios as will be described below, this being possible due to the flexibility offered by the combination of the generic, service independent, functionality of the communication session, and the service instances that define service behaviour in terms of simple leg algebra executed through the basic operations provided by the communication session.

Customer: CSR Scenario—Transfer and Conference.

For conference, a new CSR is added to the session. An existing CSR in a session uses desktop button 81E to activate functionality enabling the existing CSR to specify the characteristics of the CSR it is desired should join the current session. This information is then sent to the session service instance at the CSM 69 (for example, carried in leg messages that indicate the information is for the service instance). The service instance contacts the contact center manager system 72 to determine which CSR to invite into the session. The identified CSR is then invited into the session in the normal way using either the "Add" operation of the session or a special "Conference" tailored for such situations. An alternative approach is to have the CSR desktop system first contact the contact center management system itself to get the identity of the CSR to be invited into the session, and then to arrange for the CSR system to be able to initiate the session conference operation itself.

For transfer, the initial steps are the same as conference (but with desktop button 81D being used so as to enable a transfer request to be distinguished from a conference request). However, upon a new CSR being identified, the "Transfer" operation of the communication session is used to invite the new CSR into the session, the existing CSR being disconnected by the session upon receiving a leg message from the new CSR desktop indicating that the latter is in the established state.

Customer: CSR Scenario—Deferred Rendezvous.

In a number of situations it is desirable to be able to establish a session, at some later time, between a CSR and a customer who has been browsing the enterprise web. For example, for various reasons (such as contact center congestion, customer preference, or to avoid the customer paying for the call), the customer may be given or may specify a time when the contact center is to call back by telephone and a customer: CSR session established. This is the Deferred Callback Service with web rendezvous, previously mentioned.

So far as the customer is concerned, joining the session should be accomplished with minimum customer input and in a secure manner. To this end, the service is implemented as will now be described with reference to FIG. 20 in which the main steps are referenced by numbers in square brackets.

[1] When the customer is browsing the Web and requests help, if the customer selects the deferred callback option from the Help web page, a further web page is served by the SMS 67 for the customer to enter his or her telephone number, the callback delay, and other items of information. This form is then submitted back to the SMS.

[2] The details are extracted from this form and used as the initiation context for creation of a new session and corresponding deferred-rendezvous service instance in the same general manner already described above with reference to FIG. 6.

[3] At this time, the service instance does not seek to populate the session but, instead, returns a secret identifier to the SMS that uniquely identifies the service-instance/session. The customer information is stored with the session. Preferably, the session does not initiate the creation of a session transport at this time (this can be achieved by designing the generic session such that it only requests session transport creation after the receipt of the first Add operation request from the corresponding service instance).

[4] The customer is then returned an HTML page by the SMS 67; in essence, this page instructs the customer "Go to this "rendezvous" page, bookmark the page, and when you receive your callback telephone call, go to the book-marked page". Assuming that the customer follows the instructions, the customer then goes to the rendezvous page and bookmarks it (that is, stores the URL—or more generically—the URI of the rendezvous page as indicated by bookmark111). Loading the rendezvous page (which is served by the SMS) causes a "cookie" to be set on the customer's machine in respect of the rendezvous page. As is well known to persons skilled in the art, a "cookie" permits name/value pairs to be encoded in an HTTP response header sent from a Web server to a Web browser, and the browser will normally (this capability can be turned off) store these values in a file for a period of time specified in the cookie; during this period, any request for the page in respect of the which the cookie was created will result in the cookie being returned to the server in the HTTP page request message. In the present case, the cookie includes the secret session identifier passed to the SMS by the deferred-rendezvous service instance. This happens transparently to the customer though the identifier could also/alternatively be explicitly displayed (or otherwise presented) to the customer.

[5] The service instance 26 also places the deferred rendezvous request in a list 110 of pending callback requests, the request entry in the list including the session identifier and desired callback time. This list is periodically scanned by a rendezvous monitor daemon running on the CSM as indicated by arrow 112.

[6] When the rendezvous monitor recognises that it is time to initiate callback, it notifies the corresponding service instance.

[7] The service instance 26 now uses the services of the contact center management system 72 to identify an appropriate CSR having regard to the details previously elicited from the customer (deferred rendezvous contacts will generally be given priority over normal customer assistance requests).

[8] The service instance then causes the session 11 to invite the identified CSR into the session (thereby triggering creation of the session transport). The CSR accepts, fully joining the session and connecting to the session transport.

[9] The service instance then uses the standard functionality of the contact center management system 72 to place an outbound telephone call to the customer at the telephone number previously provided by the customer and stored with the session. At the contact center, the call is routed to the selected CSR.

[10] When the phone rings, the customer goes to the previously bookmarked rendezvous web page which results in the cookie stored on the customer's machine being returned to the SMS (it may be noted that by appropriately setting a parameter in the HTTP header in the Response message that previously served the rendezvous page, it is possible to ensure that the page is re-loaded from the SMS rather than retrieved from a local cache on the customer's machine).

[11] Either immediately, or after the customer has clicked a connect button on the rendezvous page, a script on the SMS extracts the secret session identifier from the returned cookie and informs the corresponding service instance that the customer has made contact.

[12] The service instance then proceeds to join the customer to the session in the manner already described (c.f. arrow 51 in FIG. 6) with appropriate media interfaces being created on the customer's desktop and connected to the session transport.

On joining the session, the customer finds that a CSR is already there, ready to assist.

It will be appreciated that the deferred rendezvous service is not dependent on the customer actually picking up the callback telephone call or, indeed, on the callback telephone call being made at all (though it is often convenient for the customer and CSR if such a call is made as a trigger for the rendezvous). Thus, the customer could simply be required to return to the rendezvous page at a particular time in order to be connected to the session, the CSR either being already present or invited upon the customer joining the session.

Security is provided by the use of a secret identifier to link the party making the renewed contact with the previously captured customer details. Additional security can be provided by giving the identifier a limited period of validity such as a 15 minute window either side of the allotted rendezvous time.

It will also be appreciated that a number of variations are possible in the implementation of the above-described deferred rendezvous service. For example, the creation of a service and session instance could be deferred until the customer returns to the rendezvous page provided that provision is made for storing the customer information between the initial contact and the customer's return and for linking the secret identifier with this information.

Also in this case, the secret identifier would need to be generated, for example, by one of the service front-end pages running on the SMS rather than by the service instance.

As already noted, the secret session identifier could be explicitly declared to the customer in which case the customer could be made responsible for going to the rendezvous page (not necessarily previously bookmarked) and entering the identifier into a form presented on that page, submission of the form then having the same effect as clicking on the "connect" button in the earlier described implementation of the deferred rendezvous service. Although such an arrangement has the advantage that it is not dependent on the customer being willing to accept cookies (as was the case for step [4] of FIG. 20), it is not very convenient for the customer. A further alternative is to include the session identifier in the query string of the rendezvous page URL so that bookmarking of the page also stores the session identifier and subsequent recall of the bookmarked page will result it the session identifier being returned to the server in the request URL query string. To achieve this, after the customer has submitted the context form, the customer is returned an intermediate page that includes a link to the rendezvous page, the link URL having a query string incorporating the session identifier.

In another variant, the CSR is specifically identified at the time the deferred rendezvous is set up (for example, the customer may have been allotted a particular CSR for handling their enquiries in which case the identity of this CSR is collected as part of the initial context information—indeed, the timing of the deferred rendezvous could be set in dependence of the availability of the identified CSR). In this case, step [7] of the above process can be by-passed. Furthermore, since the data identifying the CSR is short, it could be stored in the cookie (or query string) held at the customer system rather than in the context data held at the service system.

The method described in the foregoing paragraph of establishing a future communication session with a particular CSR can also be used to effectively continue, at a future time, a current session between a CSR and a customer; in this case, the customer, when requesting the future session using a request form brought up by clicking a special button displayed on their desktop, does not need to input the identity of the CSR, this identity being automatically included by the CMS 69 in the context data for the follow-up session (or included in the customer cookie). The context data for the follow-up session can include other relevant context data from the current session and also the identity of any transcription Bot (see below) that may have been joined to the session whereby upon the parties joining the follow-up session, the last content items recorded by the transcription Bot can be brought up in the media channel interfaces.

Customer: CSR Scenario—Extending a Telephone Session by Web Rendezvous

Figure 21:
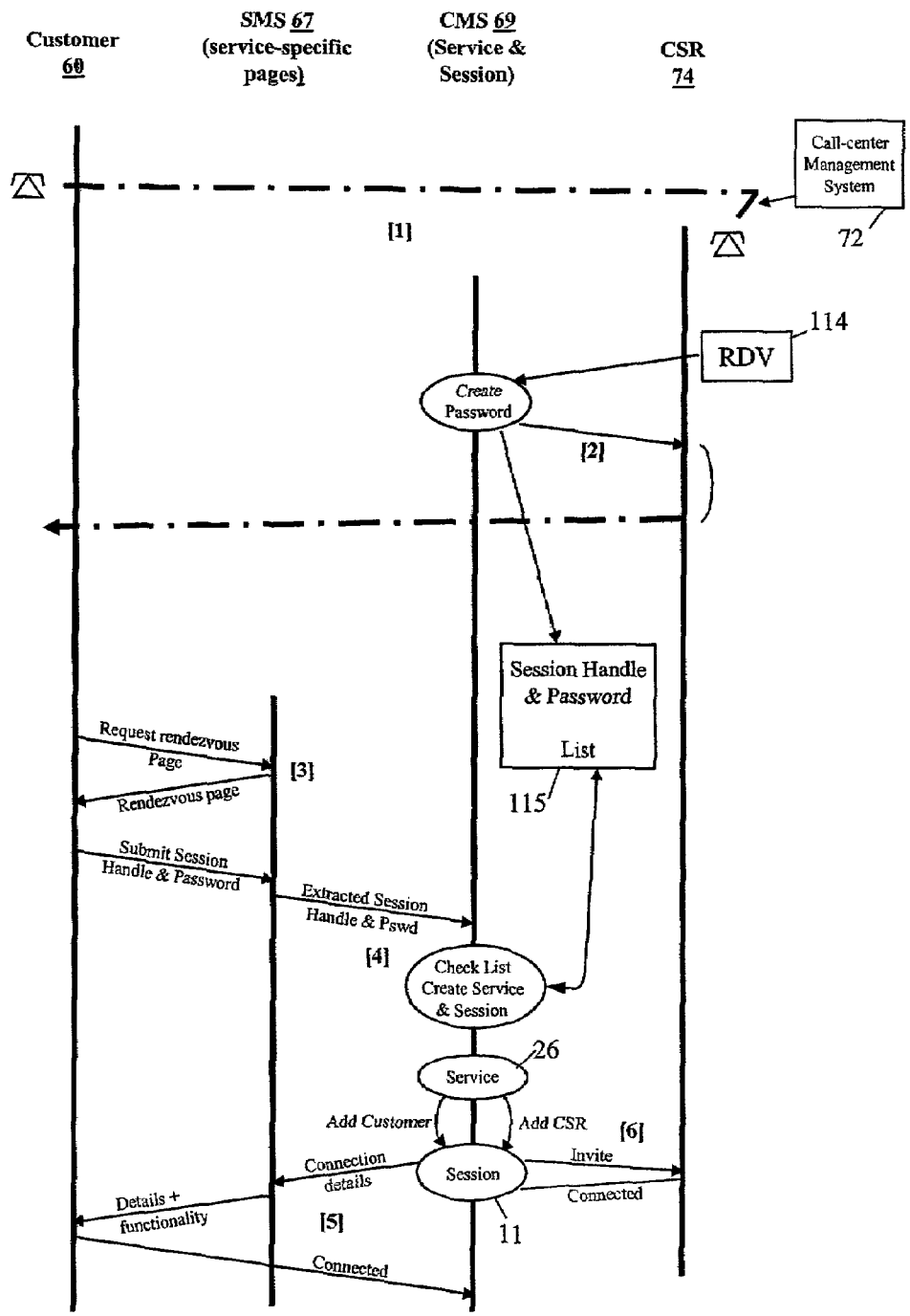
FIG. 21 is a diagram illustrating the sequence of events carried out in extending a telephone session with a web rendezvous using the web interaction service system of FIG. 7.

Since the current dominant method for a customer to contact an enterprise for help is to dial an 800 number, it would be useful to be able to add in web interaction to an existing telephone interaction between a customer and CSR. The following service, described with reference to FIG. 21, provides this facility.

[1] When the customer makes a telephone call to a contact center, a CSR is allocated to the call by the management system according to any appropriate set of criteria.

[2] As the CSR converses with the customer over the telephone, they agree that it would be useful to supplement the telephone channel by adding a web based communication for page push or chat. At this point the CSR clicks on a "Rendezvous" button on the CSR desktop which returns a session name (handle) and a password for the CSR to give to the customer (the session name concerns a session yet to be established and is not an identifier of an existing session). In the preferred embodiment of the service, the session name is simply the CSR's local name. The session password is generated dynamically by the CSM 69 as a one-time ticket in response to a request received from the CSR desktop as a result of the clicking of the Rendezvous button. This request also includes the aforesaid session name, and the session-name: password pair are stored on the CSM in a list 115 associated with the generic service. The password takes the form of a short string of digits which can be read out to the customer over the telephone.

[3] Using the telephone channel, the CSR now instructs the customer to go a Rendezvous page associated with the service (this page being one served by the SMS 67) and enter the session name and password into an HTML form.

[4] When the form is submitted the two pieces of information (session name, password) are extracted by a script running on the SMS and passed to a newly created service-specific session-initiation instance running on CSM 69. The session initiation instance checks the session name and password against the stored list 115 of such pairings and if this check is passed, the session initiation instance uses the session routing function to create a new session and corresponding service instance to which it hands over control.

Figure 6:
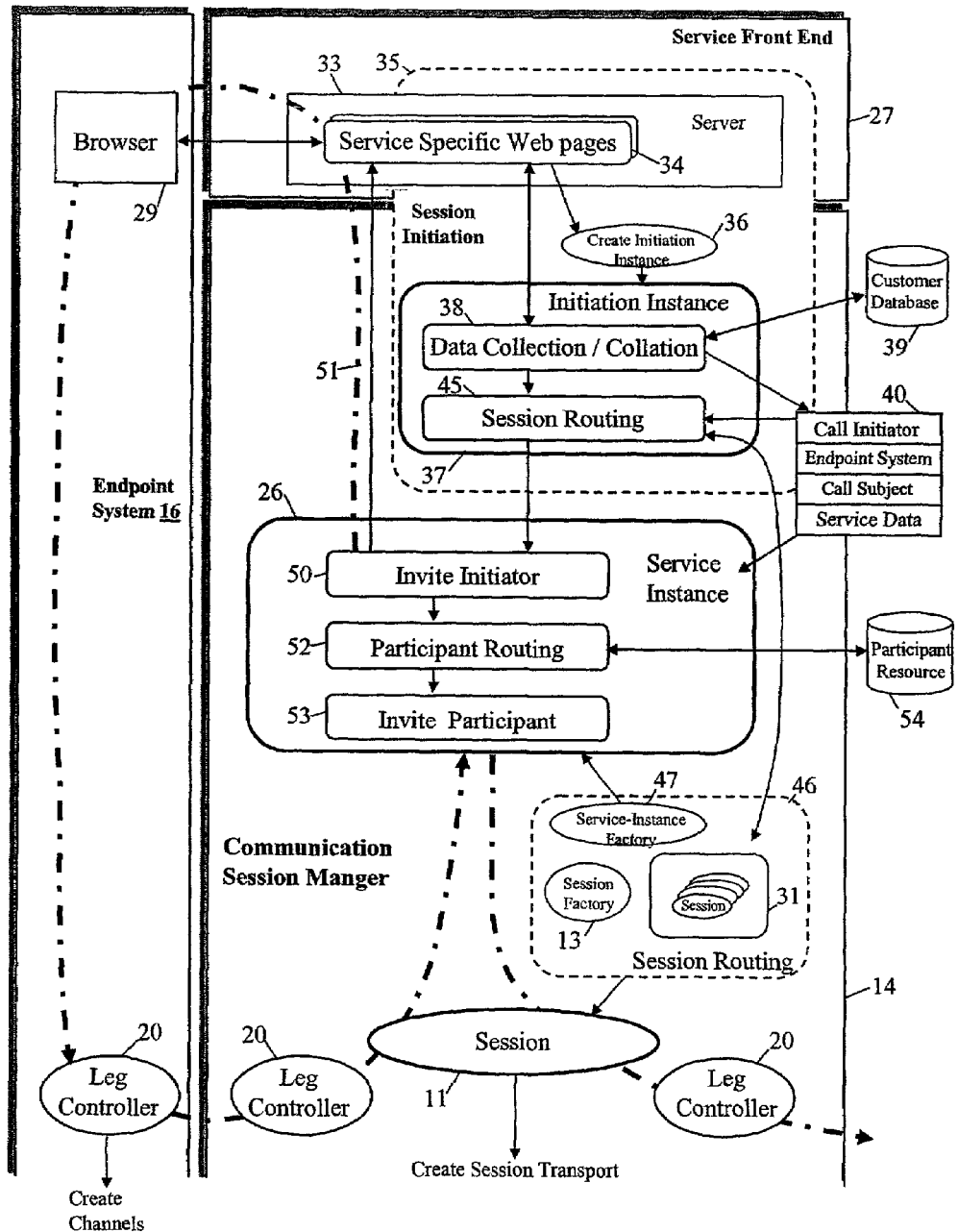
FIG. 6 is a diagram showing in detail the sequence of operations involved in routing a customer to a session and participants to the session.

[5] The customer is then invited to join the session in the manner already described above (c.f arrow 51 in FIG. 6).

[6] At the same time the CSR is also invited to join the session. The CSR is known to the service instance because this is one of the pieces of information returned by the customer (as the session name) to the SMS and passed, via the session initiation instance, to the service instance 26. Of course, there will generally be a step of mapping the CSR name as provided in the returned session name, to the operative identity of the CSR's system (this identity could be stored in the list of session-name: password pairings, the identity being provided by the CSR system when initially contacting the CSM for the password).

As can be seen, the session is set up as per a normal session except (a) it is the CSR, rather than the customer, that initiates the process by clicking on the rendezvous button; and (b) the CSR invited into the session is the CSR that the customer is already talking with, there being no need for the normal CSR selection procedure.

It is possible also to create the communication session earlier in the process (for example, when the session name and password are generated) and add the CSR to it in the expectation that the customer will join the session—indeed, this can be done even before the customer indicates a desire to communicate via a web channel. In this case the session name is more truly that, that is, an identifier of the session rather than of the CSR (though, of course, identifying the session also indirectly identifies the CSR).

In step [3] the session name and password need not be verbally passed to the customer (though this is generally the simplest way of proceeding); for example, using an acoustic coupler between the customer's telephone and the customer's endpoint computer system, the session name and password could be send as a binary signal using tone signaling or other appropriate method for transmitting data over a phone line.

The use of a password is desirable but not essential, though if no separate password is provided, the session name preferably includes a one-time component of limited validity that is checked by the CMS before connecting the customer into a session with the CSR.

Shop with Friends—Basic Scenario

Figure 22:
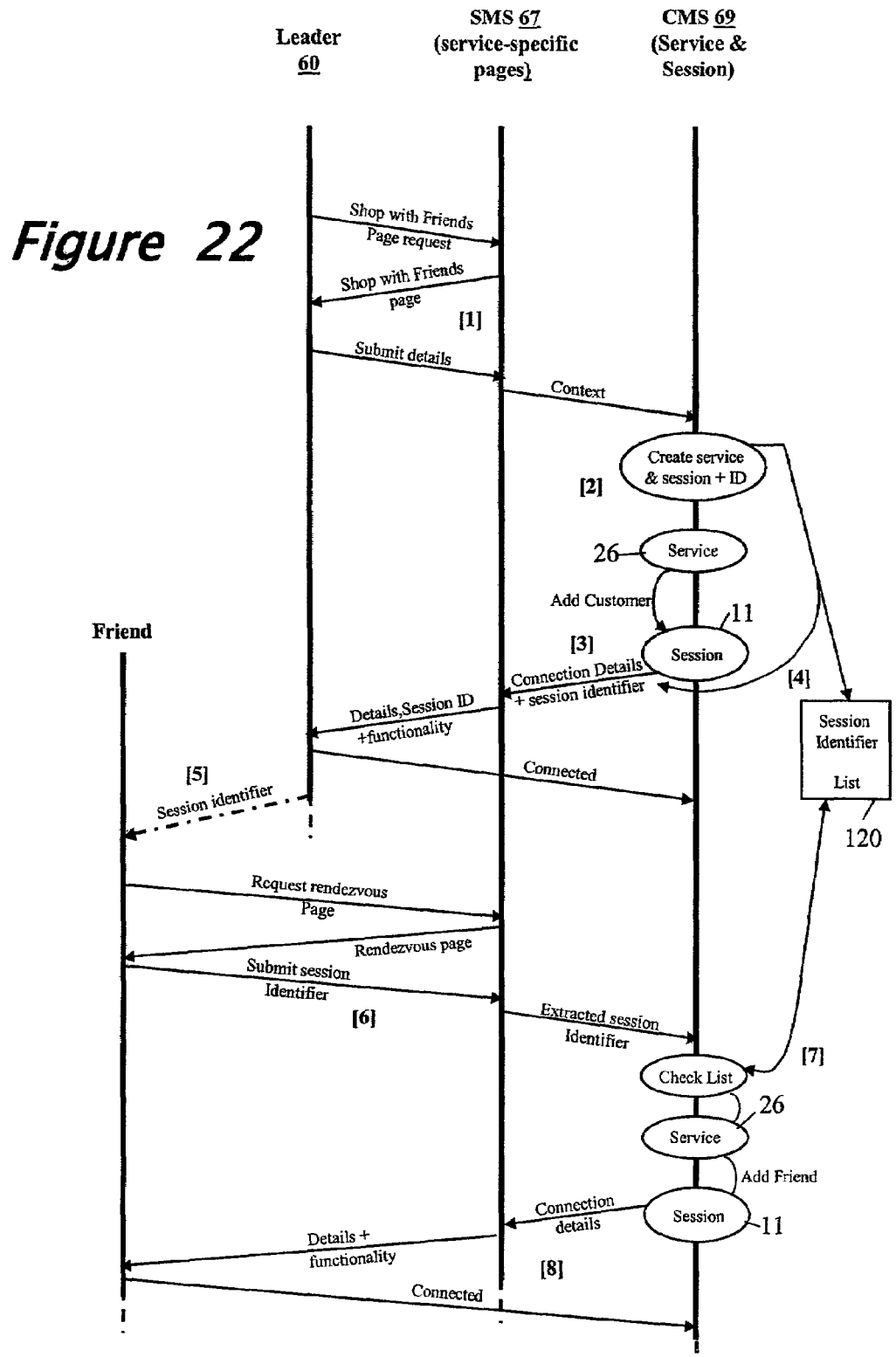
FIG. 22 is a diagram illustrating the sequence of events carried out in executing a 'Shop with Friends' service using the web interaction service system of FIG. 7.

The FIG. 7 system can also be used to run services that are not centered around contact with a CSR, including a "Shop with Friends" service such as previously described with reference to FIG. 4. The multiparty, multimedia, sessions available using the described web interaction system are well suited to provide such a service, with the page-push media GUIs 86,87 enabling the group of friends to browse web pages together and the text chat GUI 85 (or other media channel interface such as an audio interface) enabling the friends to exchange comments. A major characteristic of the "Shop with Friends" service is how the parties are brought together in the same session, that is, how a rendezvous is achieved. This is done as follows (see FIG. 22).

[1] One person in the group ("the leader") selects the "Shop with Friends" option on a web page on the enterprise server 64. This results in service-specific pages being served from the SMS 67 to capture basic context details.

[2] A new session and associated service instance are created by the CSM 69 and a session transport established, all in the same general manner as previously described.

[3] The leader is then joined to the session.

[4] During the session setup a secret session identifier in the form of session name/password text strings is created, either by the service-specific web pages served by SMS 67 or by the service instance 26 itself. The secret identifier is stored, for example, on CSM 769 in a list 120 for such identifiers, and also communicated to the group leader.

[5] The leader now communicates the secret identifier to all the other group members in any suitable manner, for example by e-mail, by an instant messaging service, by telephone, or by using a pre-arranged group page (pass-worded) where group members can meet and swap information using simpler tools.

[6] When a group member receives the secret identifier, he or she goes to a specific web page hosted by the Session Mediation Server and submits the secret identifier (session name and password).

[7] The submitted session identifier is checked against the stored secret identifiers and if a match is found, the corresponding service instance (identified through the session name included in the secret identifier, possibly with a level of indirection) is informed.

[8] The group member is then invited into the session in the manner already described, resulting in the loading of the customer desktop and joining of the session.

Joined members then use follow-me page push to view the same WWW pages, and media channels to interact.

Shop with Friends—Inviting a CSR into a Group Browsing Session

A group of friends is browsing the Web together and interacting as described previously for the Shop with Friends scenario. They decide they want to invite a CSR into the session to provide advice. To this end, the customer desktop for this service is provided with an "invite CSR" button 122 (the customer desktops are provided by the SMS and specific desktops can be served for specific services). Any member of the group can press the "invite CSR" button at any time.

Figure 23:
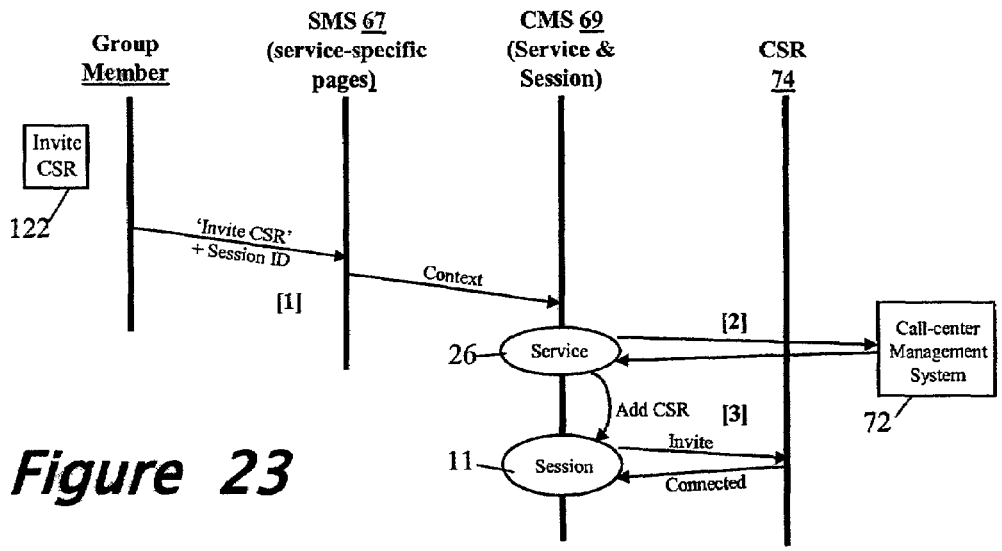
FIG. 23 is a diagram illustrating the sequence of events carried out in inviting a CSR into a 'Shop with Friends' session using the web interaction service system of FIG. 7.

When the button is pressed (step [1] in FIG. 23), an HTML request is sent to the SMS and contains the secret session identifier for the session, along with additional context about the page currently being browsed, etc. The "Invite CSR" request plus context is passed to the service instance 26 which contacts the contact center management system 72 (step [2]) to identify an available CSR appropriate to participate in the group session. The CSR is then invited to join the existing session in the normal way as described elsewhere (step [3]).

The same mechanism can be used to invite a helper Bot (see below) into the session or any other assistant entity such as a background music assistant for playing background music to participants in the session.

Shop with Friends—Follow-up Sessions

A group of friends is browsing the Web together and interacting as described previously for the Shop with Friends scenario. They decide they want to meet up again later to continue browsing together. To this end, one of the group selects a "future rendezvous" option from a drop-down menu in the page push window 86, thereby moving the group to a future rendezvous set-up form page in browser window 87. This page enables one of the group to enter details of a desired future group rendezvous and submit the details (for example, in a URL query string). The submitted details are processed by a server-side script and the future rendezvous time is confirmed back first to the submitter in a future-rendezvous meeting-point page; at the same time, a cookie is passed to the submitter including a session identifier for the future session (already created or for which details have been stored at the service system). This process is closely similar to steps [1] and [2] of the FIG. 20 deferred-rendezvous process. The other members of the group are then also passed the future-rendezvous meeting-point page and associated cookie as a result of the URL of this page being pushed to them by the page-push mechanism of the submitter. The pushed URL includes (as a query string parameter) an identifier that enables a server-side script associated with the meeting-point page to recognise that it is being asked to return the intended meeting time for a particular session and to set a cookie with the session identifier.

Figure 20:
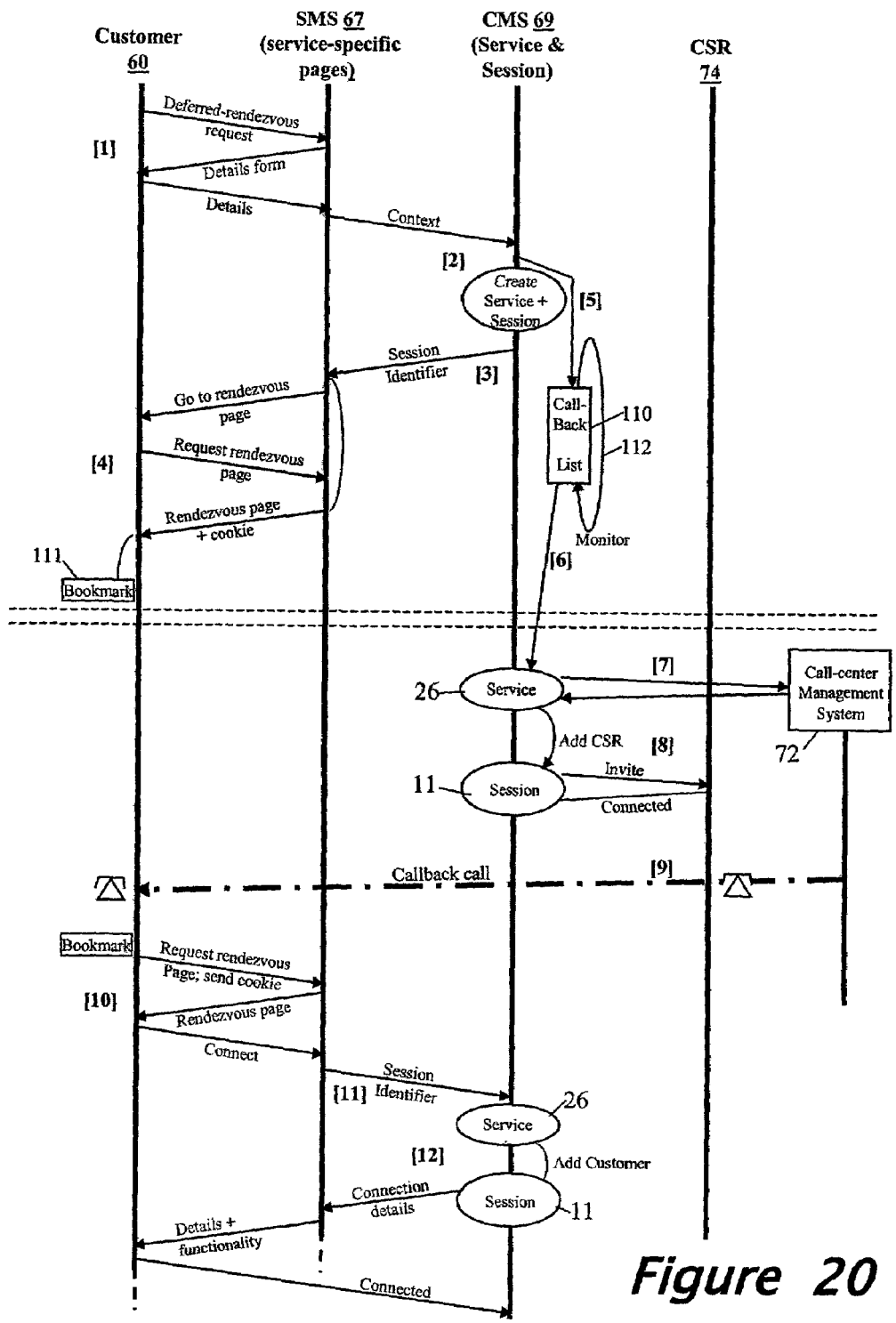
FIG. 20 is a diagram illustrating the sequence of events carried out in executing a Deferred Rendezvous service using the web interaction service system of FIG. 7.

The group members now each bookmark (set as a favourite) the meeting-point page (as per step [4] of the FIG. 20 process). Some or all of the group members may now leave the group session.

Subsequently, at the agreed time, some or all of the group members meet up again in a new session by going to the book-marked meeting-point page resulting in the cookie stored for this page being sent to the service system along with the page request. The group members then connect up to the session identified in the cookie in the same way as already described for steps [10]-[12] of the FIG. 20 process.

Of course, it would be possible to retain the initial session identifier for re-use as the identifier for the follow-up session. However, it is preferable change the session identity each time for security reasons.

Where the session identity is changed between sessions, it may nevertheless be desirable to provide a chain of session identifiers that can be followed to enable a group member who misses a group meeting to catch up with the latest session. Thus, if a group meets regularly each day, if a member misses a day and therefore does not have a cookie with the session identity for the following day, then by linking the session identifier of the missed day to that for the following day, the member can still connect to the following day's session using the cookie-carried session identifier for the missed day.

The context data for the follow-up session can include relevant context data from the current session and also the identity of any transcription Bot (see below) that may have been joined to the session whereby upon the parties joining the follow-up session, the last content items recorded by the transcription Bot can be brought up in the media channel interfaces.

Page as Place—Basic Scenario

The FIG. 7 system can also provide a "Page as Place" service such as described above with reference to FIG. 5. By way of example, the Page as Place service may be offered for a group of related web pages (such as a store guide), these pages being hosted, in the simplest case, on SMS 67 and each having a respective associated session to which parties landing on the page are automatically invited. When a party first loads one of these pages, they can be asked a few details about themselves using web form pages loaded from the SMS, this information being at least temporarily stored for use when joining each new page session (this step is optional). The party is then invited to join the session associated with the page first landed on and is provided with the customer desktop to enable that party to interact with other parties already present in the session (if any). The page session can be maintained even when there are no participants present or destroyed immediately no participant is present or after a delay (this 'no-participant' behavior is determined by the service instance associated with the session); where no session exists when a new party arrives on the web page, a session and corresponding service instance are created in the usual manner.

Each time a party moves from one page to another, the party is removed from the session associated with the old page (this can be triggered, for example, by using a JavaScript client-side JavaScript function in the old page that is triggered by the page unload event to notify the SMS) and added to the session associated with the new page (as a result of a server-side script in the new page served by the SMS).

In one implementation, the customer desktop is reloaded each time a session is joined, this being part of the standard implied invitation procedure described above. However, this continual re-writing of the customer desktop is not desirable and it is preferred that after the first serving of the customer desktop, the change to a different page providing the Page as Place service simply causes:

the customer desktop to destroy the leg controller associated with the previous page, and the SMS, in inviting the party to join the session associated with the new page, to serve only that information necessary to cause the creation of a new leg controller for contacting the corresponding leg controller of the session concerned.

As a result, the media GUIs are retained as the party moves between pages and the corresponding "Page as Place" sessions.

The customer desktop for the Page as Place service is preferably configured to provide an overview of who else is currently browsing the same page. One way of providing this information to the customer desktop is to arrange for the service instance to notify the desktop of each session participant whenever a party joins or leaves the session. This can be done, for example, by having the service instance use a dedicated media channel to which the desktops have connected (it being possible for the service instance to use the channel because it has access to the session which knows the address of the session transport). An alternative is to have the SMS serve pages with current group member details to a special browser window of the desktop (the desktop periodically requesting the latest page).

The "Page as Place" pages can be hosted on the enterprise server 64 rather than the SMS 67 provided that the SMS is notified when a page is loaded by a customer. This can be readily achieved by incorporating a compact graphical element in the page, this element needing to be fetched from the SMS. Retrieving the element from the SMS results in the running of a script on the SMS which extracts the referrer URL (i.e. the page identity) from the HTTP request header and notifies the CSM that a new person has entered that page.

Page as Place—CSR Alerted to Valuable Customer

This is a service provided by the web interaction service system to CSRs (and similar privileged parties) to automatically recognize visitors to a Web site that are of potential interest in the context concerned. This can be expressed as a service for notifying a CSR (or other privileged party) when an event or combination of events becomes true on a Web page hosted by an enterprise server. Typically, the triggering event/event combination would be the viewing of a particular page by a preferred customer. As an example, a site selling cars might place triggers on pages for high-ticket item cars (anyone viewing such a page being de facto a preferred customer). Another example is that of a site with a customer profile database where a CSR is to be notified whenever a "gold" customer enters the site.

This alerting service is provided by using the 'Page as Place' service in conjunction with customer data (extracted, for example, from a customer profile database). More particularly, customers who have had previous transactions with the enterprise are allocated a customer identifier in the form of a cookie. The cookie is returned to the web server when the customer returns to the enterprise site, and the customer identifier is extracted from the cookie and used to access a database to obtain data about the customer. In this way, it is possible to compile a table of customer and page data each time a page is accessed, the table be updated as customers load and unload pages (the latter event being detected using a Javascript "on unload" function when the customer leaves the page). The table can be continuously scanned to ascertain when particular alert trigger conditions are met.

A more detailed example will now be given with reference to FIG. 24. Suppose a CSR associated with an automobile sale website wants to be notified whenever a 'gold' customer (as specified in the customer profile of the business running the website) views a web page 124 showing a particular model of automobile. This page is set up as a 'Page as Place' web page with the basic behavior described above. The web interaction service system is provided with an alert system 125 into which CSRs can set alert triggers 126 each including a set of criteria defining a trigger condition (typically, page identity and customer attribute or attributes) and the identity of the CSR to whom the alert is to be sent when the trigger criteria are met. The alert system also includes a real time database 127 for tracking for each page being monitored, the customers currently viewing the page and selected details about them. A process 128 scans the database entries and seeks to find matches with the current set of triggers 126; if a match is found, the indicated CSR is notified. The alert system 125 can be implemented in any suitable manner—for example, the system could be run on the SMS and provide a web-based interface to the CSRs, enabling them to add/edit/delete triggers 126 and receive alert notifications.

A typical sequence of events is as follows:

[1] The CSR enters the trigger criteria to be met (in this case, 'gold' customers viewing page 124).
[2] A 'gold' customer lands on page 124 resulting in the page ID and the customer's related cookie being passed to the SMS where the customer's identity is extracted and passed with other context data to the CSM 69
[3] A session initiation instance associated with the page and customer then accesses customer profile database 39 to extract customer data (including 'gold' status); the accessing of database 39 can alternatively be done by the SMS 67.
[4] The session initiation instance routes the customer to the appropriate page service instance and the customer is added to the associated session in the manner previously described.
[5] Upon the session and its associated service being notified that the customer has successfully joined the session and session transport, the service instance notifies the real time database that the identified customer with particular attributes (in this case, including 'gold' status) has joined the session for page 124 (identified by an appropriate attribute such as its URL, page title, etc.). A corresponding entry is made in the database, this entry preferably being scanned by process 128 at this time for a match with any of the alert triggers 126. Alternatively, the process 128 scans the new entry as part of a periodic scanning of the triggers currently in the database. Upon a trigger being matched, the process 128 notifies the CSR concerned and also marks the database entry with the fact that this CSR has been notified (in order to avoid repeat notifications on the same trigger).
[6] The CSR, on receiving the notification from the alert system, decides to join the session concerned and sends a join request to the associated service instance (the session identity is passed to the CSR as part of the notification). The join request can be passed via the SMS or via a CSM message interface that gives CSRs a more direct access to the service instances. The service instance then initiates the joining of the CSR to the session after which the CSR can communicate with the customer using the established media channels.

Rather than joining the customer in the page session, the CSR may choose an alternative communication method (such as e-mail or ordinary post) or decide to take no action.

A trigger can relate to a combination of entries—thus, for example, the CSR in the above example may only want to be notified when at least three 'gold' customers are present on page 124. The process can check for this as each new entry is added to the database 127 or may be arranged to periodically scan the database in respect of "combination" triggers. Periodic scanning of the database also enables time-dependent criteria to be checked—for example, a CSR may only want to be notified of 'gold' customers joining page 124 after a certain time of day, or may only want to be notified if a 'gold' customer dwells on page 124 for more than two minutes (in this case, the database entry is time-stamped on being added to the database 127 so as to permit dwell time to be calculated).

Whilst in the above example an entry was only made in database 127 once the customer had connected to the page session, the updating of database 127 can be effected at an earlier stage in the process—for example, where the SMS is responsible for accessing customer profile database 39, it can also be made responsible for updating the database 127 at the same time as passing context information to the CSM.

The alert system is most likely to be useful in situations where customer information is available; however, this information need not necessarily be obtained from a customer profile database but could be obtained directly from the customer as part of a context data collection process carried out when the customer first lands on page 124. In the latter case, the use of a cookie is not essential; alternatively, a cookie could be used to store the required customer data, though this is not preferred for privacy reasons.

Whilst the alert system is capable of handling complex trigger conditions, it can also be used for very simple triggers such as informing a CSR whenever any customer joins a particular page; however, this may not be particularly useful use of a CSR's time.

Page as Place—CSR Overviews and Can Join

In many situations it will be useful for a CSR or CSR supervisor to be able to have an overview of all ongoing sessions associated with pages, and to be able to join a session. This can be achieved using the same type of real—time session/customer database 127 as described above with reference to FIG. 24.

More particularly, a sessions overview subsystem 150 (see FIG. 25) is provided with a real time database 127 of substantially the same form as described above and updated by adding and removing entries, again as already described. The overview sub-system is, in the present example, provided as part of the SMS 67 and includes functionality 151 (typically server-side scripts) for dynamically generating web pages in dependence on the current content of database 127. In particular, functionality 151 is operative, on request, to generate a web page listing current page sessions and their associated participants. A CSR uses the overview sub-system as follows:

[1] CSR requests the session-overview web page using the CSR desktop browser; overview sub-system returns the overview page for viewing by the CSR.

[2] The CSR decides to join one of the listed sessions and clicks on the session concerned. This results in an identifier of the session being passed via the SMS to the CSM together with an identifier of the CSR.

[3] The CSR is then joined to the indicated session in the normal way.

By arranging for the session identifier to be passed to the CSR desktop from the overview subsystem, the join request to the CSM can be made by the CSR's system rather than by the overview sub-system.

Virtual Representatives & Bots

A real, human, CSR interacts in a communication session using a desktop GUI application which provides media GUIs for each media type. In the CSR desktop described above with reference to FIGS. 9 to 17, the media GUIs and the overall session control and interaction logic, are divided into two parts, of ten called "model/view" or "semantic/presentation", according to principles well understood by persons skilled in the art. This split divides a GUI application into a part that contains the core logic and data (the 'model'; elements 24 and 90 in FIG. 13), and a part that presents this to the user (the 'view'; elements 82 and 85 to 88 in FIG. 13). By splitting the application into two parts in this way, and by using standard techniques such as object-oriented programming (e.g. Java Beans), it is possible for a software automaton to interact with a session (and its associated service instance and session transport) in exactly the same way as a human being, with the difference that a human being interacts via the view components, and the automaton interacts directly via the underlying model components.

To give an example, suppose the chat media type component receives a "new chat text" event, and delivers a line of text chat to be displayed. For a human being this text would be passed to the view component for display in the chat window, while for an automaton the text would be passed directly to the automaton (and, in particular, into a natural language parser of the automaton).

As a result, an automaton can be set up to do anything in a communication session that a human being can do. Below are described several bots arranged to interact with the web interaction service system to carry out useful tasks. Several of these Bots make use of a "stealth" feature enabling them to join and be present in a session without the other session participants being aware of this. More particularly, where the joining of a participant would normally be communicated to the other participants, the silent joining of a Bot can be achieved by providing a stealth attribute for each participant which the session (or its associated service instance) examines before announcing the arrival of the new participant to the other participants; if the attribute is set 'true', no joining announcement is made and, optionally, the session transport can be instructed not to transmit on any output from the participant in the stealth mode. The stealth attribute can be set 'true' by a joining participant, though this ability is preferably restricted to privileged entities (generally Bots but potentially also human CSR supervisors, etc). At any time the privileged entity may decide to set the stealth attribute to "false", thereby removing the stealth measures (such as blocking of outward transmissions) for the participant concerned and, optionally, also announcing the presence of the previously-hidden participant as if the latter had only just joined the session.

Multi-channel Personalised Marketing Bot

This Bot is applicable, for example, to the customer: contact-center scenario where a customer is waiting to either initiate or resume communication with a CSR.

Consider the situation of the customer having requested contact with a CSR and having been invited into and joined a new communication session (i.e step [6] of FIG. 8 has been completed). The customer is now left waiting for a CSR to be allocated and joined to the session (steps [7], [8] and [9] of FIG. 8). This may take some time and the customer may therefore be given feedback about how long it will take for a CSR to answer their call (for example, either via an existing media channel or by returning an HTML page to a customer browser window when polled by the Customer Desktop). However, more efficient use of that wait time can be made by presenting the customer with content of potential interest to them.

To this end, upon the customer joining the session and a CSR allocation request being sent by the session service instance to the contact center management system, the service instance invites a special Marketing Bot to join the communication session for either interactive or non-interactive content presentation to the customer, pending a CSR joining the session. The Bot selects content for presentation and sends it to the customer desktop using a media channel present in the current session. Upon receipt of this content, the customer desktop displays it in the most appropriate manner. The content may be a reference (e.g. URL) to the information to be displayed or the data itself.

Figure 25:
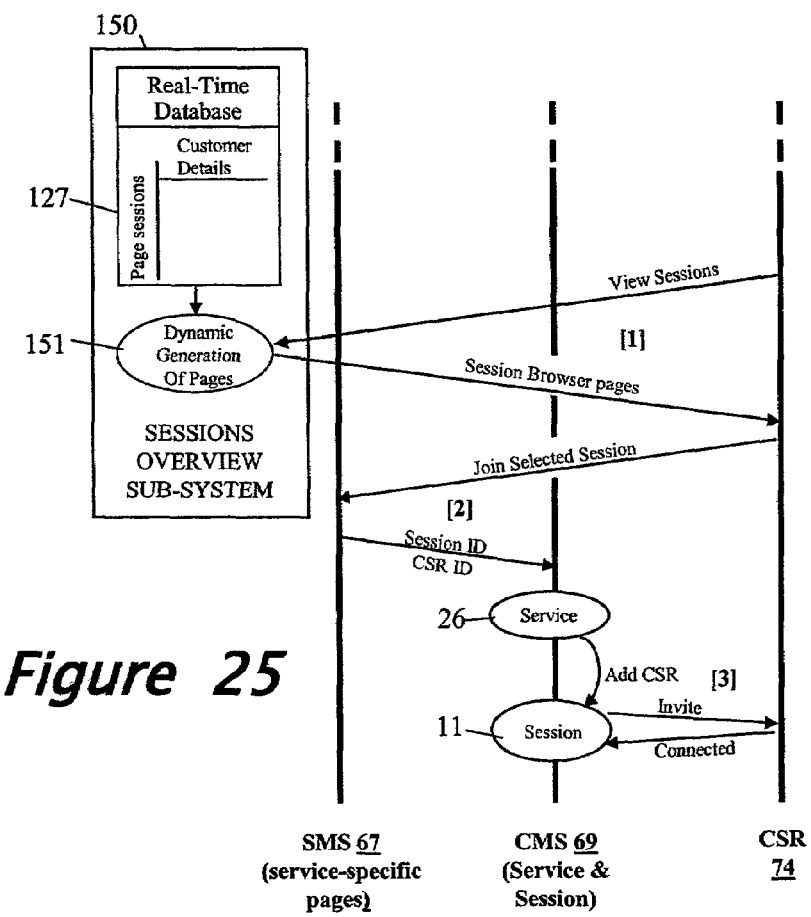
FIG. 25 is a diagram illustrating a session browser available to a CSR using the web interaction service system of FIG. 7, and the sequence of events carried out when the CSR decides to join a particular session.
Figure 26:
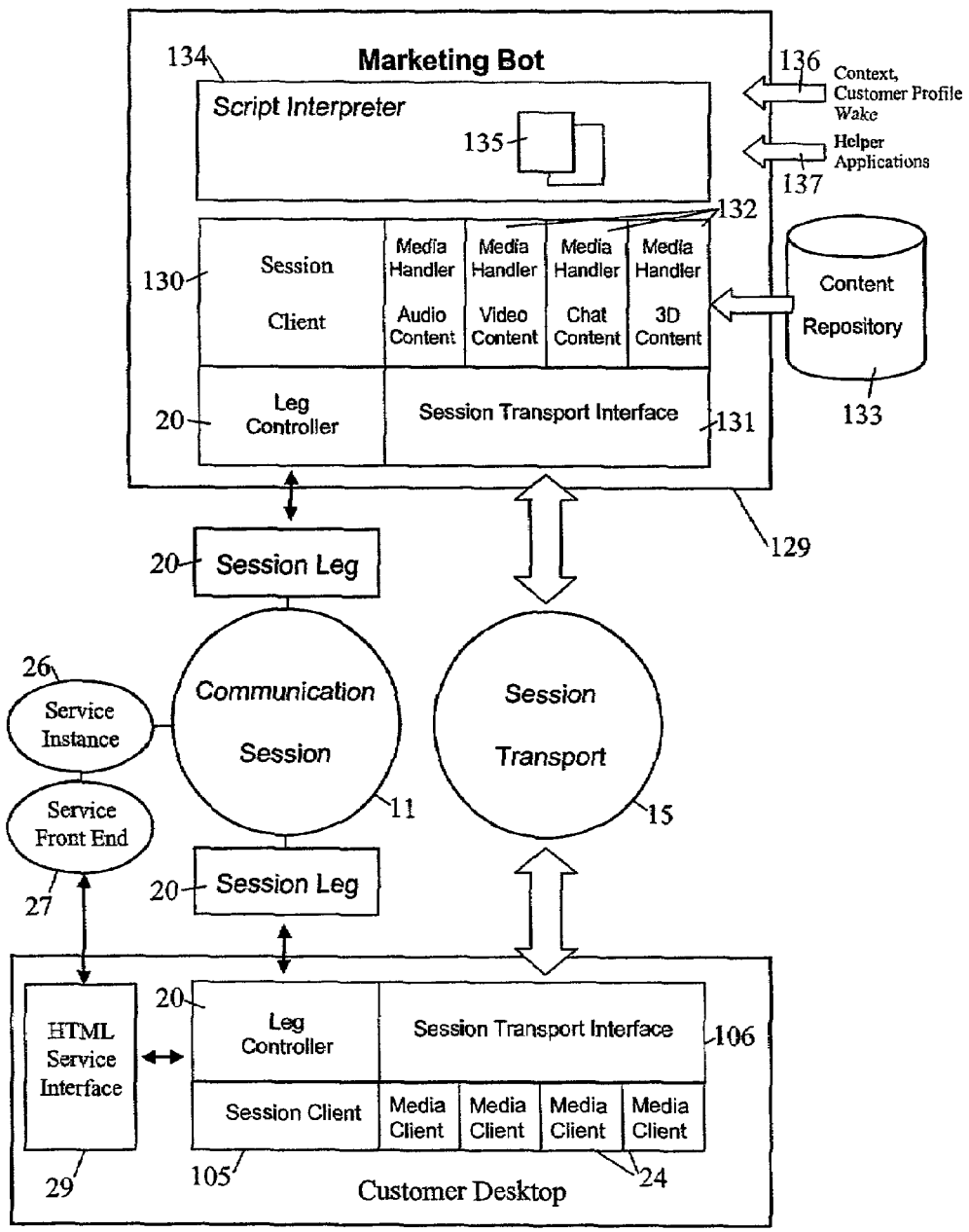
FIG. 26 is a diagram of the functional components of a marketing BOT.

The Bot is a software component that has the same basic functions as the CSR desktop and uses the same session and transport interfaces as the CSR desktop to interact with the session and exchange media content with the customer, the latter being done using the same media channels as are to be used subsequently by the allocated CSR desktop. All the media clients in the customer desktop are exposed in this way to the Bot. Thus, anything a CSR can do with a customer, the Marketing Bot can also do FIG. 26 illustrates the general structure of the Marketing Bot 129 against that of the Customer Desktop, the components of the latter being given the same reference numerals as in FIG. 18 Customer Desktop (since the Customer Desktop in FIG. 25 is of substantially the same form as described with reference to FIG. 18, the Customer Desktop shown in FIG. 25 will not be further described). The Marketing Bot 129 joins the session using its communication session client 130 and leg controller 20 (the latter having been instantiated, as in the CSR Desktop, by leg initiator functionality, not shown, in response to the join invitation from the session 11). For each media type supported by the customer's desktop for the current session, there is a media content handler 132 responsible for media of that type (the Bot 129 knows which media types are being used in the session, and therefore what handlers to instantiate, because it has been passed the media description when it was invited into the session). Each media handler 132 is connected to the corresponding media channel of the session transport 15 using the session transport functionality 131 of the Bot. In the present example, four representative content handlers 132 are shown, for audio, video, chat and 3D content. Each media handler is responsible for accessing media of the corresponding type from a content repository 133 (typically, a collection of media files on hard disk.).

A script interpreter 134 is provided for running scripts 135 for use, for example, in effecting content selection and controlling the media handlers 132 to present the selected content to the customer via the appropriate media channel (amongst those available); scripts 134 can also be used to manage customer interactions where content presentation is done interactively. When the Bot first joins the session, a manager script is run in order to effect initial content selection; this selection is done on the basis of the available information about the customer (see arrow 136 and the further description below). The manager script may also control subsequent content updates. However, where the content presentation is interactive, control is likely to pass to the element currently called upon to present content to the customer (this element may be another script or a helper application 137 such as a Bot with an associated knowledge base for answering specific types of queries).

As already indicated, content presentation can be done non-interactively or interactively. If non-interactive content presentation is used, then the content is preferably periodically updated, not only to enable a range of information to be presented to the customer, but also to reassure the customer that their machine has not been disconnected from the call centre. Alternatively, the content may invite the customer to interact with it, e.g. conversing with a bot (effectively a sub-bot used by the Marketing Bot), reviewing a product presentation, etc., providing a more involving experience and reducing the likelihood that the customer will abandon the call. Customer input can be passed to the Marketing Bot either over a relevant media channel or via a special control channel, the input being detected by appropriate functionality associated with the channel concerned. In either case, the customer input can be used to control the content delivered over one channel or over all channels (in this latter case, the input will generally be passed to a controlling script running in the script interpreter).

The media channel that is used and the way in which the content is displayed on the customer desktop is completely open. If the content is a URL then it may be displayed in an existing window on the customer desktop, e.g. the page push window, or a new window might be opened to display the content (and any subsequent updates). If the content is being presented for interactive use, then either the chat channel could be used and the existing chat user interface leveraged or a separate window opened for the new content which may also be distributed on a dedicated channel. Indeed, content may be transmitted on multiple channels simultaneously, e.g. a text description of the accompanying a 3D product visualisation.

As regards the selection of content for presentation to the user, this is preferably done of the basis of the available information about the customer (such as the customer's interests). This available information includes the initiation context for the session which will already contain some information about the customer and the subject in which the customer is currently interested. Additional information may be available from a personal profile associated with the customer (held, for example, in database 39 shown in FIGS. 6 and 7), the profile having been constructed from previous interactions with the call centre and/or provided by the customer through use of a form. The "wake" of the customer showing the progress of the customer through the website pages may also be available from a wake repository. Financial data (e.g credit limit, spend pattern) may be obtainable from an enterprise customer accounting system.

Once a CSR joins the session, the content presented by the Bot 129 is removed from the customer desktop; this can be automatically in response to the session Connected event reporting joining of the CSR, or can be done in response to an erase input from the CSR or customer. This explicit erase alternative enables the customer first to question the CSR about the content presented by the Bot 129 should the customer so wish. To facilitate this, as the CSR desktop connects to each media channel, it is preferably delivered the last content item passed along that channel to the customer. This can be achieved by using a transcript Bot that is joined to the session at the same time as the marketing Bot. The transcript Bot is similar in form to the Marketing Bot except that the functionality overlying the media handlers 142 is record (and playback) functionality for each channel. The transcript serves to record the media content delivered through each channel either for offline analysis, or for playback down the channels to one or more selected participants. In the present case, upon the service instance receiving notification that the CSR desktop has connected to the session transport, it commands the transcript Bot (via any of the communication paths available to it) to replay to the CSR desktop the most recent content passed down each channel. The transcript Bot does this by sending the content over the channels to the session transport functionality at the service system together with an indication that the content is only to be sent on the CSR desktop; the session transport then delivers the content accordingly. This replay feature can usefully be provided in any situation where a party is joining a non-empty session.

At any point after the call has been allocated to a CSR, that CSR may choose to transfer the call to a colleague. If there is a delay before being connected to the new CSR, the pushing of personalised content using Bot 129 to the customer can be resumed.

The use of Bot 129 is not restricted to the presentation of marketing information and other types of information could equally well be presented. Furthermore, the Bot 129 can be used in scenarios additional to the customer: CSR scenario; for example, in the "Shop with Friends" scenario, after the group leader has joined the session and is waiting for the other group members to connect ,it may be useful to use a Bot 129 to present useful information to the leader about how best to explore the site of interest.

Content Semantics Monitoring Bot

A content monitoring Bot can be used to help a CSR supervisor in their job of ensuring that CSRs handle calls in an efficient and customer-friendly manner.

In a first role, the content monitoring Bot seeks to match content being exchanged across the session transport of a session, with one or more prescribed filter criteria (generally words and phrases but any media-content attribute value can be used as a criterion), and to alert interested parties when a match is found. Example uses of such filters are:

Detecting the presence of profanity or abusive terms and phrases.

Detecting the transmission/sharing of undesirable material or references to such material.

In a second role, the content-monitoring Bot can be used to collect and analyse statistics on a call based on the content sent between customer(s) and CSR which could be used to identify (among others):

Call duration.

CSR performance in terms, for example, of speed of response to customer's inputs. i.e. some measure of time between receiving content on a channel and responding to it.

A long call duration with a low response rate might indicate an overloaded CSR (potentially too many simultaneous calls), and a long call duration with a high response rate might indicate an overly "chatty" CSR.

Figure 27:
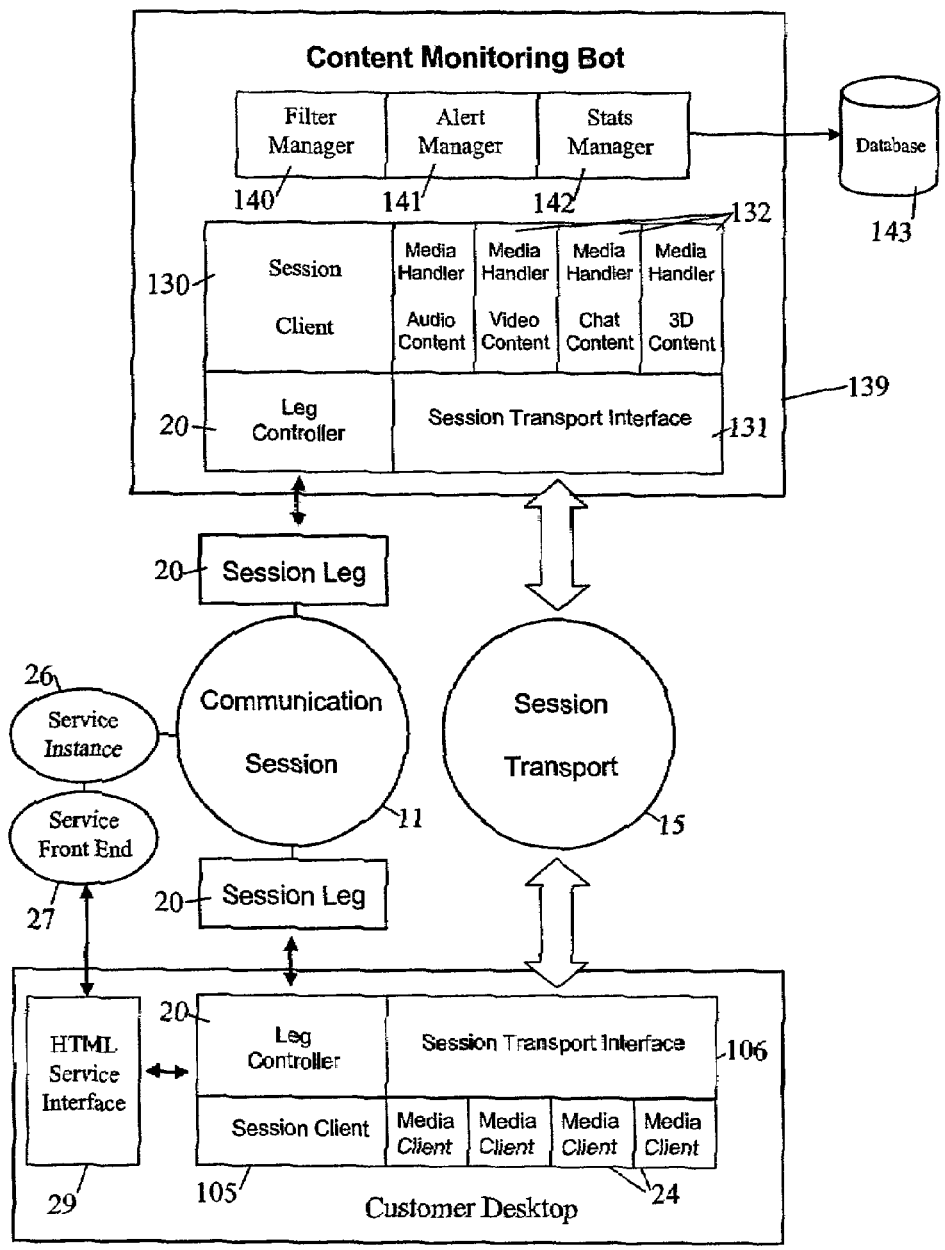
FIG. 27 is a diagram of the functional components of a content-monitoring BOT.

The structure of the Content-Monitoring Bot is shown in FIG. 27. The structure is similar to that of the Marketing Bot 129 (FIG. 26) described above except that now the functionality overlying the media handlers 132 is concerned with monitoring the content received through these handlers over the media channels associated with a session being monitored. This functionality comprises a filter manager 140 and alert manager 141 for carrying out the first role mentioned above, and a statistics manager 142 for carrying out the second role.

The content-monitoring Bot 139 is arranged to join a selected session silently, that is, without being announced or without otherwise being detectable by the other session participants. This is done by using the above-described stealth attribute which the Bot 139 sets "true" upon joining the session.

As regards the selection of the session to be monitored by the Bot 139, this can be done explicitly by a supervisor (for example, by viewing a session list as described above in relation to FIG. 25, and designating a session for the Bot to join). Alternatively, sessions can be randomly or systematically selected for monitoring (for example, all sessions involving a particular CSR could be monitored, this being achievable by setting an appropriate alert trigger using the arrangement of FIG. 24, with the alert messages being used to automatically join the Bot to the session concerned). Of course, multiple sessions can be monitored at the same time, for example by instantiating a respective Bot for each session to be monitored.

The filter manager 140 interfaces with the media handlers 132 to evaluate the filters it has been provided with against incoming content. In its simplest form, the filter manager 140 is restricted to monitoring a chat channel for specific words and phrases. However, the same architecture can be applied to monitoring arbitrary media channels with the use of conversion functionality to turn the received content into a form that can be easily compared with filter criteria; for example, for the filter manager to monitor an audio chat channel, it is provided with a speech-to-text converter, the filter criteria generally taking the form of words and phrases specified in text format.

Where a page-push channel is provided, the content filters applied to that channel will generally take the form of URLs or domain names (corresponding, for example, to sites offering obscene content).

When a match is found between the content being monitored and a filter, the alert manager 141 is informed and an appropriate action is taken depending upon which filter matched and what the media channel was. Typically that action is to send a message to the supervisor's desktop indicating what the problem is, the session details, the content causing the alert, and whether the CSR or the customer was responsible for that content. The supervisor can then decide whether any further action should be taken, e.g. joining the session, terminating it, etc.

The Bot may also provide the supervisor with a transcript of the content exchange across the channel concerned leading up to the alert, and communicate with a transcript Bot to ensure that this transcript is saved for further examination; the transcript Bot (described above) is joined to the session at the same time as the content monitoring Bot. The analysis of the exchanged content can be used to improve CSR scripts, contributing to a knowledge base or even providing material for a Bot that acts as a virtual CSR. There are also further applications to which the content monitoring Bot can be put, such as using the chat transcripts for refining the Frequently Asked Questions knowledge base found on most web sites, acting as a "did you know?" helper that suggests other material that might be relevant when it detects keywords, etc.

The statistics manager 142 uses the media handler interfaces to extract pertinent statistical information that is logged to a database 143 for later evaluation.

Although the content-monitoring Bot has been described above in the context of a contact center, it will be appreciated that the Bot can also be used in other situations not restricted to customer service centres.

Automatic Helper Bot

This Bot provides help to participants in a page-specific communication session, the Bot joining the session upon the exchanged content indicating that assistance may be needed. The helper Bot is basically an extension of the content-monitoring Bot and like the latter uses stealth mode to silently join and monitor content in a selected session (selected in any suitable manner as described above for the content monitoring Bot). The helper Bot monitors for triggers that are specified, for example, in the form of specific content (such as particular keywords like "help" or the equivalent in other media types), content combinations, or content patterns. A trigger condition can involve content combinations or patterns involving content from multiple channels.

Upon a trigger being matched, the helper Bot automatically sets its stealth mode attribute to 'false' thereby making its presence in the session known to the other session participants (so far as they are concerned, it appears as if the Bot has timely joined the session). The helper Bot then seeks to provide page-specific assistance on the basis of its knowledge of the page contents and potentially also of the participants concerned (information about the participants being available in the session and possibly also from a customer profile database). The helper Bot will generally not be tied to a specific page but will provide page-specific assistance on the basis of a knowledge of the page associated with the session and information about that page contained in a knowledgebase accessible to the helper Bot.

Where the helper Bot uses the session/customer real-time database 127 to select a session to join, the identity of the page session and its current participants is readily available to the helper Bot.

Moreover, customer context information can be automatically extracted as described earlier.

The helper Bot can also be joined to sessions that are not tied to particular pages; in this case, the helper Bot can be arranged to adapt the assistance it gives to a currently viewed page (where the page identity is available) or simply to the content most recently received over the media channels.

Variants

It will be appreciated that many variants are possible to the above-described web interaction system. For example, the connection state of an endpoint system could be communicated to a session instance by the corresponding transport instance rather than through leg controllers. As regards session identifiers, these can take many forms and, indeed, can be anything that can directly or indirectly identify a created or to be created session.

Whilst FIGS. 20-22, 24 illustrate particular services in the case of end user systems provided with applet desktops, it will be appreciated that the same services could equally be provided with the Lite desktop (or, indeed, any other suitable user interface).

The service system can be a third party system accessed by users, including contact center CSRs, over the internet.

The invention claimed is:

1. An automaton for providing media content to media channels of a network communication session, the automaton comprising:

a manager system configured to:
  join the automaton to an existing network communication session between an endpoint entity and a contact center responsive to receipt of an invitation to join the existing network communication session, and
  receive: (a) context data about the existing network communication session and (b) channel information about one or more media channels of the existing network communication session, wherein the channel information includes media type carried by the media channels and channel connection details;
a transport system configured to establish, based on the received channel information, one or more media channel connections from the automaton to a session transport mechanism associated with the existing network communication session;
a media content handler configured to deliver media content of a particular media type to the established one or more media channel connections based on the received channel information; and
a delivery controller configured to control the selection and delivery of media content by the media content handler responsive to the received context data.

2. An automaton as in claim 1, the manager system further configured to cause the automaton to leave the existing network communication session upon an other endpoint entity at the contact center joining the existing network communication session.

3. An automaton as in claim 1, the manager system further configured to join the automaton to the existing network communication session if an other endpoint entity at the contact center has not joined the existing network communication session.

4. An automaton as in claim 1, the manager system further configured to join the automaton to the existing network communication session if an other endpoint entity at the contact center and connected to the existing network communication session has left the existing network communication session.

5. An automaton as in claim 1, further comprising a content library providing media sources of different media type for use by the media content handler.

6. An automaton as in claim 1, wherein the context data comprises an indication of a target subject, the delivery controller using the target subject indication to determine at least an initial content for delivery on at least one of the one or more media channel connections.

7. An automaton as in claim 1, wherein the context data comprises the identity of a party at the endpoint entity joined to the existing network communication session, the delivery controller using the identity to query a database about the party, the delivery controller using the query results to determine at least an initial content for delivery on at least one of the one or more media channel connections.

8. An automaton as in claim 1, the delivery controller further configured to cause media content to be simultaneously delivered across multiple media channel connections of the existing network communication session.

9. An automaton as in claim 1, wherein the delivered media content is non-interactive with respect to the endpoint entity joined to the established communication session, and the delivery controller is further configured to periodically cause new content to be delivered on the one or more media channel connections.

10. An automaton as in claim 1, wherein the delivered media content comprises active components enabling a party at the endpoint entity joined to the existing network communication session to provide input regarding future content to be delivered, the input being received by the automaton and used by the delivery controller to control subsequent media content delivered by the media content handler.

11. In combination, an automaton as in claim 1, and a service system for setting up a network communication session with an associated transport mechanism allowing the exchange of data, via multiple data transfer channels for different media types, between endpoint entities joined to the session; the service system, in setting up a network communication session, creating a service-session functional entity for controlling the joining of endpoint entities to the network communication session in accordance with a predetermined service behavior, and the service-session functional entity being responsible for joining the automaton to the network communication session as required by said service behavior, the joining of the automaton to the network communication session comprising sending of the context data and the channel information to the automaton.

12. A combination as in claim 11, wherein the service session functional entity is operative to join the automaton to an existing network communication session during a period when the endpoint entity awaits the joining of an other endpoint entity at the contact center corresponding.

13. A combination as in claim 12, wherein the automaton is automatically caused to leave the existing network communication session upon the other endpoint entity joining the session.

14. A combination as in claim 12, wherein upon the other endpoint entity joining the session, the automaton remains in the session until explicitly dismissed by the other endpoint entity.

15. A combination as in claim 11, further comprising a transcription entity joined to the session with the automaton to record the media content delivered by the automaton, the transcription entity being controllable by the other endpoint entity to play back at least selected portions of the media content delivered by the automaton.

16. A combination as in claim 11, wherein the service-session functional entity comprises a session instance with generic behavior for adding and removing endpoint entities to the network communication session and for recording the endpoint entities currently joined to the network communication session, and an associated service instance with service-specific behavior determining when the session instance is to add and remove endpoint entities.

17. A combination as in claim 11, wherein the state of connection of the automaton to the transport mechanism is signaled to the session-service functional entity by leg messages passed between a leg controller of the entity manager of the automaton and a corresponding leg controller of the service-session functional entity.

18. A method of providing media content to media channels of a network communication session, the method comprising:
  establishing a media channel connection from an automaton to a session transport mechanism associated with an existing network communication session between an endpoint entity and a contact center responsive to receipt of an invitation to join the existing network communication session and receipt of channel information about one or more media channels of the existing network communication session, the channel information including the media type carried by the one or more media channels and channel connection details; and providing an appropriate media content from the automaton to a corresponding media channel established by said establishing step responsive to receipt of context data about the existing network communication session and based on the channel information.

19. A computer-readable medium storing instructions which, when executed by a processor, causes the processor to perform the method of claim 18.

20. A device for performing the method of claim 18.

* * * * *